(12) United States Patent
Massie et al.

(10) Patent No.: US 7,136,642 B1
(45) Date of Patent: Nov. 14, 2006

(54) SYSTEM AND METHOD OF QUERYING A DEVICE, CHECKING DEVICE ROAMING HISTORY AND/OR OBTAINING DEVICE MODEM STATISTICS WHEN DEVICE IS WITHIN A HOME NETWORK AND/OR A COMPLEMENTARY NETWORK

(76) Inventors: Rodney E. Massie, 300 Knightsbridge Pkwy., Lincolnshire, IL (US) 60069; Chantel M. Speaks, 300 Knightsbridge Pkwy., Lincolnshire, IL (US) 60069; Julian M. Franklin, 300 Knightsbridge Pkwy., Lincolnshire, IL (US) 60069; Patrick Leboulanger, 300 Knightsbridge Pkwy., Lincolnshire, IL (US) 60069

( * ) Notice: Subject to any disclaimer, the term of this patent is extended or adjusted under 35 U.S.C. 154(b) by 0 days.

(21) Appl. No.: 11/370,103

(22) Filed: Mar. 8, 2006

Related U.S. Application Data

(60) Division of application No. 10/614,391, filed on Jul. 8, 2003, now Pat. No. 7,024,199, which is a continuation-in-part of application No. 09/958,752, filed on Oct. 12, 2001, now Pat. No. 6,947,737.

(60) Provisional application No. 60/173,742, filed on Dec. 30, 1999.

(51) Int. Cl.
*H04Q 7/20* (2006.01)

(52) U.S. Cl. .................. 455/428; 455/432.3; 455/432.1

(58) Field of Classification Search ............. 455/432.3, 455/455, 426.2, 428, 432.1, 435.1, 435.2, 455/403, 414.1, 560, 426.1, 454, 448, 417; 370/351, 353, 355, 356
See application file for complete search history.

(56) References Cited

U.S. PATENT DOCUMENTS

| | | | |
|---|---|---|---|
| 4,412,292 A | 10/1983 | Sedam et al. | |
| 4,910,794 A | 3/1990 | Mahany | |
| 4,924,462 A | 5/1990 | Sojka | |
| 4,940,974 A | 7/1990 | Sojka | |
| 5,442,568 A | 8/1995 | Ostendorf et al. | |
| 5,457,680 A | 10/1995 | Kamm et al. | |
| 5,475,597 A | 12/1995 | Buck | |
| 5,559,520 A | 9/1996 | Barzegar et al. | |
| 5,561,446 A | 10/1996 | Montlick | |
| 5,603,081 A | 2/1997 | Raith et al. | |
| 5,608,643 A | 3/1997 | Wichter et al. | |
| 5,703,570 A | 12/1997 | Gorday et al. | |
| 5,719,771 A | 2/1998 | Buck et al. | |
| 5,772,599 A | 6/1998 | Nevo et al. | |
| 5,787,357 A | 7/1998 | Salin | |
| 5,819,172 A | 10/1998 | Campana, Jr. et al. | |
| 5,822,216 A | 10/1998 | Satchell, Jr. et al. | |
| 5,835,720 A | 11/1998 | Nelson et al. | |
| 5,859,838 A | 1/1999 | Soliman | |
| 5,878,036 A | 3/1999 | Spartz et al. | |

(Continued)

FOREIGN PATENT DOCUMENTS

EP       0 809 383       11/1997

(Continued)

OTHER PUBLICATIONS

1999. "Overview of IPM." Cisco Systems Inc. http://www.cisco.com/univercd/cc/td/doc/p...rtrmgmt/ipmcw2k/ipm20/ipmover.html.

(Continued)

*Primary Examiner*—Eliseo Ramos-Feliciano
*Assistant Examiner*—Chuck Huynh
(74) *Attorney, Agent, or Firm*—The Patent Source

(57) ABSTRACT

A system and method for enabling a user to query availability, roaming history and/or modem statistics of a wireless device that can roam between at least two different wireless networks, without assistance from network service provider personnel.

10 Claims, 13 Drawing Sheets

U.S. PATENT DOCUMENTS

| | | | |
|---|---|---|---|
| 5,884,202 | A | 3/1999 | Arjomand |
| 5,940,751 | A | 8/1999 | Kaplan et al. |
| 5,940,771 | A | 8/1999 | Gollnick et al. |
| 5,941,363 | A | 8/1999 | Partyka et al. |
| 5,963,452 | A | 10/1999 | Etoh et al. |
| 5,974,236 | A | 10/1999 | Sherman |
| 5,974,300 | A | 10/1999 | LaPorta et al. |
| 5,978,679 | A | 11/1999 | Agre |
| 6,028,846 | A | 2/2000 | Cain |
| 6,056,194 | A | 5/2000 | Kolls |
| 6,078,891 | A | 6/2000 | Riordan et al. |
| 6,097,947 | A | 8/2000 | Takai |
| 6,097,962 | A | 8/2000 | Corriveau et al. |
| 6,104,712 | A | 8/2000 | Robert et al. |
| 6,116,743 | A | 9/2000 | Hoek |
| 6,128,320 | A | 10/2000 | Watanabe et al. |
| 6,134,671 | A | 10/2000 | Commerford et al. |
| 6,137,791 | A * | 10/2000 | Frid et al. .................. 370/352 |
| 6,138,022 | A | 10/2000 | Strawczynski et al. |
| 6,178,337 | B1 | 1/2001 | Spartz et al. |
| 6,185,619 | B1 | 2/2001 | Joffe et al. |

FOREIGN PATENT DOCUMENTS

| | | |
|---|---|---|
| EP | 0 967 775 | 12/1999 |
| WO | WO-97/47144 | 12/1997 |

OTHER PUBLICATIONS

2001. "Research In Motion: RIM 850 Wireless Handheld." *GoAmerica: Wire Data Solutions;*. wysiwyg://127/http://www.goamerica.net/showcase/rim850/index.htm.

2001. "Technical Information: Routing Requirements on the Moteint Network." *PARTNERAREA*. wwww.motient.com/content/partnerarea...program/technicalinformation/technical.

2001. "Understanding ARP: A NetworkUptime.com Tutorial." *Network Tutorials*. www.networkuptime.com/tutorials/arp.

Apr. 11, 2000. "Computer Associates and American Mobile Satellite Corp. Extend Wireless Enterprise Applications for eBusiness: Mobile eBusiness Applications Take Off with ARDIS Wireless Data Network Seamlessly Integrated With CA's Unicenter TNG." *Press Room*. wysiwyg://235/http://www.ca.com/press/2000/04/tng_americanmobile.html.

Apr. 11, 2000. "Computer Associates Dispenses New Revenue Opportunities for the Vending Machine Industry With Unicenter TNG Optimal Vending Solution: CA and cStar Partner to Deliver Increased Customer Service Levels and Reduced Operational Costs With Remote eBusiness Management Application." *Press Room*. wysiwyg://231/http://www.ca.com/press/2000/04/tng_vending/html.

Apr. 5, 2001. International Search Report from PCT Application No. PCT/US00/35513.

ARDIS Company. 1994. ARDIS Network Connectivity Guide.

ARDIS Company. 1997. ARDIS DataTac 4000: Software Developers Reference Guide. Revision 2.0.

ARDIS Company. Jan. 1997. ARDIS DataTac 4000: Software Developers Reference Guide. Revision 2.0.

Apr. 11, 2000. "Computer Associates and Moteint Extend Wireless Enterprise Applications for eBusiness." *AboutMotient*. www.motient.com/content/aboutmotient/businesspartners/ca.html.

Casselman, Grace. May 5, 2000. "Net Mania Abounds at CA World." *NetworkWorld*. www.itworldcanada.com/nw/archive/nw10-09.nw_Wtemplate.cfm?filename=n109n2.html.

Computer Associates. 1999. "Unicenter TNG: Total Enterprise Management." Islandia, New York: Computer Asociates International Inc.

Dec. 1993. "Software Product Description: RoamAbout Transport Version 2.0 for MS-DOS and MS-Windows." *digital*.

Fabris, Peter, May 15, 1998. "Advanced Navigation." *CIP Magazine*.

Fairhurst, Gorry. Jan. 1, 2001. "Address Resolution Protocol (arp)." www.erg.abdn.ac.uk/users/gorry/course/inet-pages/arp.htm.

Flack, Marjorie. 2001. "The Story of the PING Program." http://ftp.arl.mil.~mike/ping.html.

Fonseca, Brian. Apr. 11, 2000. "Computer Associates touts in Unicenter platform for device management." Infoworld.com. www.infoworld.com/cgi-bin/deletefr...cles/en/xml/00/4/000411encamobile.xn.

Gagnon, Louis-Philippe and Nick Ratelle. Feb. 28, 2001. "RIM: Pager gone PDA". Macadamian Technologies Inc. www.macadamian.com/column./rimdevelopment.htm.

Greiner, Lynn. Aug. 27, 1999. "Online Management Becomes the Real Thing." *Computer Dealer News*. www.cstartech.com/real_thing1.html.

Hays, Constance L. Oct. 23, 2001. "For Retailers of Luxury Goods, Business Has Dried Up." CBSMarketWatch.com.

Hypponen, Mikko. Sep. 2000. "WAP and Viruses—Can your Mobile Phone Get Infected?" *Virus Bulletin Conference*. Virus Bulletin Ltd, The Pentagon, Abingdon, Oxfordshire, England.

Jarosik, Michael. "The Wireless Battleground." *Business uplugged*: [part3].

Jul. 19, 1999. "American Mobile to Deliver Wireless Telemetry Applications Through Partnerships with CA and cStar Technologies; ARDIS Network to be Utilized for Monitoring Remote Devises; Vending Machines, Utility Meters, Traffic Lights and ATMs Targeted." *In The News*. 1999 Press Releases. Motient Coproration. www.motient.com/Content/IntheNews/PressReleases/1999Releases/99-20.html.

Kessler, Gary C. Apr. 23, 1999. "An Overview of TCP/IP Protocols and the Internet." Hill Associates, Inc.

Kessler, Gary C. May 29, 2001. "An Overview of TCP/IP Protocols and the Internet."

Mar. 27, 2001. "Overview: Cisco Wireless Network Management Suite 1.0" http://www.cisco.com/univercd/cc/td/doc/product/rtrmgmt/wireless/nm_suite.html.

May 23, 2001. "ARP." *Enterprise Storage Strategies Conference & EXPO*. internet.com. wysiwyg://69/http://www.pcwebopedia.com/TERM/A/ARP.htm.

McMahan, Michael L., Ali Khatzibadeh and Pradeep Shah. "Wireless Systems and Technology Overview." Dallas, Texas: Texas Instruments.

Menezes, Joaquim. May 26, 2000. "Enterprise Computing." *Computing Canada, The Newspaper for Information Technology Management*, vol. 26, Issue 11. www.cstartech.com/enterprise2.html.

Moss, Julian. Sep. 1997. "Understanding TCP/IP." *PC Network Advisor*, Issue 87, pp. 3-6.

Motorola. 1995. *DataTAC Open Protocol Specifcations: User's Guide*. Richmond, British Columbia: Motorola, Inc.

Motorola. 1995. *DataTAC Open Protocol Specifications: Standard Context Routing Release 1.0*. Richmond, British Comlumbia: Motorola, Inc.

Motorola. 1997. "Multiple Agencies Share New System in Peel Region." *Exchange Online*. www.motorola.com/LMPS/RNSG/exchange/spr97/index.html.

Motorola. 1997. *DataTac Wireless Data Networks: Applications Development Guide* . Richmond, Virginia: Motorola, Inc.

Motorola. 2001. "Vanguard Applications Ware Serial Feature Protocols: TPDU Protocol." Mansfield, Massachusetts: Motorola, Inc. pp. 1-101.

Motorola. Jan. 1996. *DataTAC Networks: Introduction for Application Developers*. Bothell, Washington: Motorola, Inc.

Motorola. Mar. 2000. *DataTAC 5000 System Release 6.1: Application Programmer's Guide* Richmond, British Columbia: Motorola, Inc.

Motorola. Nov. 1995. *DataTAC Open Protocol Specifications: DataTAC Messaging Release 1.0*. Richmond, British Columbia: Motorola, Inc.

Motorola. Nov. 1997. *DataTAC Wireless Data Networks: Application Development Guide*. Bothell, Washington: Motorola IPSG.

Motorola. Sep. 1995. *Wireless Data Communications: The Choices*. Bothell, Washington: Motorola, Inc.

Noble, B., G. Nguyen, M. Satyanarayanan and R. Katz. Oct. 1996. "Mobile Ntework Tracing." *Internet RFC/STD/FYI/BCP Archives*.

Nov. 7, 1999. "How ARP Works & Why Duplicate Addresses Shouldn't Be Used." *Microsoft Product Support Services*. wysiwgy://85/http://support.Microsoft.com/support/kb/articles/Q93/5/58.A.

Nov. 8, 2001. Written Opinion from PCT Application No. PCT/US00/35513.

Oct. 3, 2001. "TCP/IP and IPX routing Tutorial." *Sangoma Technologies*.

Pentikousis, Kostas. 2000. "TCP In Wired-Cum-Wireless Environments." *IEE Communications Surveys*. Fourth Quarter 2000, pp. 2-14.

Ping. *Connected: An Internet Encyclopedia*. wysiwyg://75/http://www.freesoft.org/CIE/Topics/53.html.

Salkintzis, Apostolis K. 1999. "A Survey of Mobile Data Networks." *IEEE Communications Surveys..* Third Quarter 1999, vol. 2, No. 3.

Sep. 2000. "Creating Internet Wave III by Connecting Non-IT World to IT World Via any Media [Wireless WAN, LAN, Landline & PLC (power Line Carrier)]." *CStar Technologies Inc*. www.startech.com/newpg.htm.

Sep. 2000. "DirectGateTM, Features & Benefits." http://www.cstartech.com/ben.html.

Sep. 2000. "Entrerprise Management Strategy: Managing the Extended Enterprise." *Unicenter TNG*. Computer Associates International, Inc. http://cai.com/products/unicent/whitepap.html.

Sep. 2000. "SNA." *ATM Protocol Directory*. http://www.protocols.com/pbook/sna.html.

Sep. 2000. "System Performance & Hardware Platform." http://www.cstartech.com/hard.html.

Sep. 2000. "Vending." *Rutherford & Associates*. www.ruthsx.com/products/vending.html.

Sep. 2000. "X.25" *ATM Protocol Directory*. http://www.protocols.com/pbook/x25.html.

Sevitt, Carol. 2000. "Solbyung (Stella) Yoon: Living Her Dream." *Rotman Management: The Alumni Magazine of the Rortman School of Management*. www.cstartech.com/rotmanm.html.

Stallings, William. "Data and Computer Communications." *Electronic Mail—SMTP and Mime*. MacMillan, 5th edition, pp. 701-724.

Stilwell, Markus. Nov. 16, 1995. *What is Data Mining?* www.cs.usask.ca/homepages/grads/mgs310/Cmpt826S3/node5.html.

Unger, Lorin. Feb. 14, 2001. "Blackberry 957." Wap.com. wysiwgy://165/http://www.wap.com/share/osas/cache/artid500407.html.

Unicenter TNG® Optimal Vending Solution. *Real World Management Solutions*.

\* cited by examiner

| TIME (GMT) | NETWORK | STATUS | POWER SAVE |
|---|---|---|---|
| 1999-10-23.04:10 | 47 | IN SERVICE | YES |
| 1999-10-23.02:26 | 47 | OUT OF SERVICE | YES |
| 1999-10-23.02:26 | 47 | IN SERVICE | YES |
| 1999-10-23.02:25 | 47 | OUT OF SERVICE | YES |
| 1999-10-22.23:31 | 47 | IN SERVICE | YES |
| 1999-10-22.23:19 | 12 | IN SERVICE | YES |
| 1999-10-22.20:16 | 47 | IN SERVICE | YES |
| 1999-10-22.20:13 | 12 | IN SERVICE | YES |
| 1999-10-22.18:55 | 47 | IN SERVICE | YES |
| 1999-10-22.18:47 | 12 | IN SERVICE | YES |
| 1999-10-22.13:15 | 47 | IN SERVICE | YES |

FIG. 12

| STATISTIC | |
|---|---|
| GOOD PDUs RECEIVED BY MODEM | :3 |
| BAD PDUs RECEIVED BY MODEM | :0 |
| RESPONSE PDUs RECEIVED BY MODEM | :3 |
| PDUs SENT BY MODEM | :3 |
| PDUs SENT BY MODEM (WITH RETRIES) | :3 |
| BLOCKS SENT BY MODEM | :9 |
| BLOCKS SENT BY MODEM (SQUARED) | :33 |
| REGISTRATION REQUESTS SENT BY MODEM | :3 |
| RESPONSE PDUs SENT BY MODEM | :3 |

FIG. 13

SYSTEM AND METHOD OF QUERYING A DEVICE, CHECKING DEVICE ROAMING HISTORY AND/OR OBTAINING DEVICE MODEM STATISTICS WHEN DEVICE IS WITHIN A HOME NETWORK AND/OR A COMPLEMENTARY NETWORK

RELATED APPLICATIONS

This application is a Divisional of U.S. application Ser. No. 10/614,391, now U.S. Pat. No. 7,024,199, with a filing date of Jul. 8, 2003 and entitled "System and Method of Querying a Device, Checking Device Roaming History and/or Obtaining Device Modem Statistics When Device is Within a Home Network and/or a Complementary Network", which is a Continuation-In-Part and claims priority to U.S. patent application Ser. No. 09/958,752, filed Oct. 12, 2001, now U.S. Pat. No. 6,947,737, which claims priority to U.S. provisional application Ser. No. 60/173,742 filed on Dec. 30, 1999 and entitled "(1) ACE Advantages, (2) ACE Redundancy, (3) ACE Manager Problem Diagnosis Tool, (4) Bell Mobility (Canada) Connectivity, (5) Fixed Point Polling Service", all of which are incorporated herein by reference.

BACKGROUND OF THE INVENTION

1. Field of the Invention

The present invention relates generally to a system and method of enabling a user to query a device when the device is within a home network and/or a secondary network. More particularly, in embodiments of the invention, the present invention relates to a system and method of enabling a user to, independently and without having to interact with primary and/or secondary network personnel, determine device availability, functionality and/or status, access device roaming history, and/or obtain device modem statistics when the device is within a home network and/or a secondary/complementary network.

2. Background Description

FIGS. 1–2 show a prior art method and apparatus for discovering devices on a network, as disclosed in U.S. Pat. No. 5,835,720, incorporated herein by reference. FIG. 1 shows a network 110 which includes first, second and third subnets S1, S2 and S3. The subnets S1, S2 and S3 can have the same topology or different topologies (e.g., Token ring, Ethernet, X.25 and FDDI). Devices 112, 114 and 116 are connected to the first subnet S1; devices 118, 120, 122 and 124 are connected to the second subnet S2; and devices 126, 128, 130, 132 and 134 are connected to the third subnet S3. The devices 112–134 can be workstations, personal computers, hubs, printers, etc. Additional devices on the network 110 include a first router 136 for interconnecting the first, second and third subnets S1, S2 and S3; and a second router 138 for connecting the second subnet S2 to other networks. The network 110 is scalable, which allows computing resources to be added as needed. Although only several devices 112–138 are shown, the network 110 can encompass up to tens of thousands of addressable devices.

TCP/IP is used to regulate how data is packeted into IP packets and transported between the devices 112–138. Each device 112–138 has a physical address and a unique Internet protocol (IP) address. The IP address includes a network number and a host number. The host number is broken down into a subnet part and a host part.

IP packets are sent from a source device on the first subnet S1 (device 12, for example) to a destination device on the first subnet S1 (device 114, for example). The IP packets contain the IP address of the destination device 114. The subnet part of the destination IP address indicates that the destination device 114 is local, so the source device 112 retrieves its local ARP (Address Resolution Protocol) table from its ARP cache. The ARP table is used for mapping the IP address onto a physical address. If the destination IP address is found on the ARP table, the source device 112 reads the physical address off the local ARP table, adds appropriate headers (including the physical address of the destination device 114) to the IP packets, and sends the resulting frame over the first subnet S1.

If the destination device 114 is not on the ARP table, the source device 112 issues an ARP request to locate the destination device 114. The ARP request includes the IP and physical addresses of the source device 112 and the IP address of the destination device 114. All devices receiving the ARP request check to see if their IP address matches the destination IP address in the ARP request. The destination device 114 makes a match and responds by returning its physical address to the source device 112. The source device 112 makes an entry for the destination device 114 in its ARP table (the entry including the physical address of the destination device 114), adds the physical address of the destination device 114 to the IP packets, and transmits the resulting frames over the first subnet S3.

IP packets are sent from the source device 112 to a destination device on the third subnet S3 (device 130). The subnet part of the destination IP address indicates that the destination device 130 is not local, so the source device 112 retrieves its local routing table from the ARP cache.

The local routing table contains information needed to route the IP packets to next-hop gateways. The information includes entries that indicate the next-hop routers by their IP addresses. At a minimum, the local routing table contains an entry for a default router. In this example, the default router is the first router 136. The routing table may also contain many other entries for other gateways on the network 110. The source device 112 forwards the IP packets to the first router 136.

The first router 136 receives the IP packets and retrieves an IP address table from its ARP cache. The IP address table includes an address for each interface. The IP address table includes IP address 129.144.74.1 for the first subnet S1, IP address 129.144.75.1 for the second subnet S2, and IP address 129.144.76.1 for the third subnet S3. By masking the destination IP address to obtain its subnet part (a mask from the IP address table is used) and comparing the masked IP address to the addresses in the IP address table, the first router 36 determines that the IP packets should be sent to the third subnet S3. The first router 136 looks at its ARP table (which was retrieved with the IP address table) for the physical address of the destination device 130. The first router 36 maintains an ARP table of the devices that have been active (i.e., communicating) over an interval (e.g., five minutes). If the destination IP address is not on its ARP table, the first router 136 issues an ARP request. After the destination device 130 is found, the first router 136 adds the destination physical address to the IP packets and transmits the resulting frames over the third subnet S3 to the destination device 130.

Had the destination IP address not fit in one of the subnets on the IP address table, the first router 136 would have checked its routing table (which was also retrieved with the IP address table) and forwarded the IP packets to the next-hop router (i.e., the second router 38).

The network 110 additionally includes a network manager 140, which is connected to the first subnet S1. Simple Network Management Protocol (SNMP) is used by the network manager 140 for managing the devices 112–138 that support SNMP. The devices 112–138 that do not support SNMP can be managed by a protocol such as ICMP. Each SNMP-manageable device stores in its memory a Management Information Base (MIB). The MIB is a collection of objects or variables representing different aspects of the device (e.g., configuration, statistics, status, control). Each device is associated with an agent, which is a software program that may or may not be resident in the device. The agents allow the network manager 40 to access the MIB of each SNMP-manageable device. Such accessibility allows the network manager 140 to perform its management tasks. For a general description of network management, see W. Stallings, "Data and Computer Communications", MacMillan (4th ed., 1994) pp. 701–24, which is incorporated herein by reference.

FIG. 2 shows the network manager 140 in greater detail. The network manager 140 includes a workstation 142 such as a SPARCstation™ or SPARCserver™.

Both of these models use a RISC-based high-performance "SPARC" microprocessor 43. The SPARCstation™, SPARCserver™ and "SPARC" microprocessor are all commercially available from Sun Microsystems, Inc. The workstation 242 is configured with a color display monitor 244 and a CD ROM drive 246 for distribution media. It is also configured with volatile memory 248 such as DRAM and non-volatile memory 250 such as a hard drive.

The Network Manager 110 includes a "UNIX"-based operating system 252. The operating system 252 is stored on the network manager's hard drive 250.

Also stored on the hard drive 250 is software for directing the network manager 240 to perform its many tasks. The software includes a Graphical User Interface (GUI) 254, a network topology database 256 and a Discover program 258. Running the Discover program 258, the network manager 240 seeks out IP and SNMP-addressable devices on the network 110, and adds instances of discovered devices to the network topology database 256.

The Discover program 258 can be distributed on a portable computer memory medium, such as a CD ROM. Distributed as such, the CD ROM is inserted into the CD ROM drive 246 and the Discover program 258 is installed onto the hard drive 250. Instead of installing the Discover program 258 onto the hard drive 250, however, it can be accessed directly from the CD ROM drive 246.

The Discover program 258 can be run directly from the operating system 252. The location and name of the Discover program's executable file are typed in at the command line. Specifiers can also be typed in at the command line, or they can be provided in a configuration file. If no specifiers are typed in at the command line, default specifiers are used. The specifiers, which provide options for running and configuring the program, will be discussed below.

In the alternative, the Discover program 258 can be run from the GUI 254. A Discover program icon is double clicked, causing a Discover Properties dialog box to appear. The Discover Properties dialog box shows the current configuration of the Discover program, provides an option that allows the Discover program to be reconfigured with new specifiers, and a button for running the Discover program 58 as currently configured.

Reference is now made to FIG. 3, which shows the steps performed by the network manger 140 under the direction of the Discover program 258. The Discover program 258 offers a choice of searches: an ARP/Ping search, an ARP-only search, and a Ping search (step 300). One is selected. The ARP/Ping search is selected by default. If it is desired to perform either the ARP-only search or the Ping search, a specifier (e.g., -A or -P) is typed in at the command line or button (e.g., ARP-only button or Ping button) is clicked on in the Discover Properties dialog box.

The network manager 240 begins with the steps of building a hierarchical data structure of the network topology. The hierarchical data structure indicates networks, subnets for each network, and gateways, hosts and links (physical and logical) for each subnet. The data structure is stored in non-volatile memory 250. To build the hierarchical data structure, the network manager 240 accesses its IP address table and local routing table in its ARP cache (step 302). IP addresses in the IP address table, which are used to identify the subnets, are added to the hierarchical data structure (step 304). The local routing table is used to identify a default router. The local routing table might also identify additional gateways. IP addresses of the default router and any other gateways are added to the hierarchical data structure (step 306).

The IP addresses of the routers are also added to a Gateway list, which can be stored in computer memory (not shown). Before a gateway is saved in the Gateway list, however, the network manager 240 performs a traceroutes operation to determine the number of hops to that gateway (step 308). Each gateway that a packet must traverse is counted as a hop. The traceroutes operation also identifies physical and logical links, which are added to the hierarchical data structure (step 310). If a gateway is within a "Maximum Hops" threshold, its IP address is appended to the Gateway list (step 312). By default, the Maximum Hops threshold is set to zero so that only the local ARP cache is accessed.

If the Maximum Hops threshold is greater than zero (step 314), the network manager 40 retrieves the routing table, IP address table and ARP table of the default router using a series of SNMP Get_Next messages (step 316). The default router's IP address table indicates the IP addresses of the subnets S2 and S2 and any other interfaces. IP addresses of the interfaces are added to the hierarchical data structure (step 318). The default router's routing table identifies other gateways, which are added to the hierarchical data structure. Only IP addresses of those gateways within the Maximum Hops threshold are appended to the Gateway list (step 320).

If the default router does not support SNMP, the network manager 240 can use the traceroutes operation to find additional gateways. If additional gateways are found, their IP address tables, routing tables and ARP tables are retrieved. Gateways within the Maximum Hops threshold are appended to the Gateway list.

The network manager 240 then proceeds down the Gateway list. Routing tables, IP address tables and ARP tables of the next entry on the Gateway list are retrieved (step 322). Newly-discovered networks, subnets and gateways are added to the hierarchical data structure (step 324), and newly-discovered gateways within the Maximum Hops threshold are appended to the Gateway list (step 326). By appending newly discovered gateways to the Gateway list and advancing down the Gateway list, the network manager 240 leapfrogs from gateway to gateway, identifying even more routers, subnets and networks. Once the network manager 240 has reached the end of the Gateway list (step 328), it has completed the construction of the hierarchical data structure.

The steps 302–328 of building the hierarchical data structure can be skipped or modified if a Search file containing specific gateways is made accessible to the Discover program 258. The gateways in the Search file are identified by their IP addresses. If a specifier (e.g., "ONLY") is provided in the Search file, the search is limited only to those gateways specified in the Search file. If the specifier is omitted, the search begins with those gateways specified in the Search file and then continues with the search above, accessing routing tables and IP address tables from all gateways within the Maximum Hops threshold. Any gateway that is unreachable is ignored. The name of the Search file can be entered on the command line of the operating system or through the Discover Properties dialog box of the GUI 254.

After the hierarchical data structure has been built, the network manager 240 performs a search. If the Ping search is selected (step 330), the network manager 240 sends ICMP echo request messages over the network 10 (step 332). The network manager 240 can be programmed to send out the ICMP echo request messages to all addresses on the network in a conventional manner.

If either the ARP/Ping or the ARP-only search is selected, the network manager 240 retrieves its local ARP, IP address and routing tables using UNIX system calls (step 334). Then, using SNMP requests, the network manager 240 retrieves the ARP tables from all gateways listed in the Gateway list (step 336). For example, the network manager 240 might find the following ARP table from the first router 136:

| Device | IP address | IP Name | Mask | Phys Addr |
|---|---|---|---|---|
| 16 | 129.144.74.1 | udmpk-16c-74 | 255.255.255.255 | 00:40:0b:40:76:1d |
| 12 | 129.144.74.5 | dakota-74 | 255.255.255.255 | 00:40:0b:40:f6:45 |
| 14 | 129.144.74.34 | cicada-74 | 255.255.255.255 | 00:40:0b:40:f6:43 |
| 20 | 129.144.75.12 | certo | 255.255.255.255 | 08:00:20:76:a3:9f |
| 22 | 129.144.75.15 | emp | 255.255.255.255 | 08:00:20:10:2c:e7 |
| 24 | 129.144.75.114 | measures-74 | 255.255.255.255 | 08:00:20:76:78:37 |

The network manager 240 immediately saves the IP addresses from the ARP table in the hierarchical data structure (step 338). The network manager 240 can also ping each device that it finds in the ARP table (step 340). This step is performed for IP address verification purposes.

The network manager 240 also immediately classifies the devices (step 342) and updates the network topology database 256 with the classified devices (step 344).

Classification can be performed by reading the device's SNMP system description (e.g., sysobject ID) and mapping the system description to a particular device class. The network topology database 256 is essentially an internal hierarchy of data structure files and instance files. The data structure files include structures of devices, views (collections of devices), buses (e.g., a Token Ring Local Area Network (LAN) segment) and connections (e.g., an RS-232 link). The network manager 240 polls the MIB of each discovered device for system information. The system information is passed to an Applications Program Interface (API) which, using basic API calls, creates instance files of the data structures and adds the instance files to the network topology database 256.

If the ARP-only search was selected (step 346), the network manager 240 might try to identify hosts (step 348).

If the ARP/Ping search is selected, the network manager 240 performs a more exhaustive search on the network, sending ICMP echo request messages to the remaining addresses of the subnets listed in the Hierarchy file (step 350). The ICMP echo request messages can be sent in a conventional manner.

Thus, U.S. Pat. No. 6,137,791 is directed to voice communication between a first data packet network using a MIM and a second data packet network utilizing a Personal Digital Cellular Mobility Method (PMM). We have determined that there is a need for a mechanism that enables users to independently, optionally without assistance from primary and/or secondary wireless network personnel, determine availability, functionality and/or status of a wireless device, access device roaming history and/or obtain device modem statistics when the queried device is operating within a home network or a secondary/complementary network. Accordingly, there is also a need for a system and method that enables a user to query a wireless device in such a manner.

SUMMARY OF THE INVENTION

It is a feature and advantage of the present invention to enable a user to determine the availability of a wireless communication device (hereinafter device) within a home network and/or a complementary network, optionally and advantageously without having to interact with personnel of either network.

It is another optional feature and advantage of the present invention to enable a user to determine the roaming history, status or other network communication history or status of a device within a home network and/or a complementary network, optionally without having to interact with personnel of either network.

It is another feature and advantage of the present invention to enable a user to obtain modem statistics or other status information of a device within a home network and/or a complementary network, without having to interact with personnel of either network.

In one embodiment, the present invention provides a system and method for enabling a user to utilize, for example, a conventional personal computer (PC), or other subscriber unit (SU) such as an intelligent terminal or computing device, handheld device, and/or other communications or wireless device to query a device or wireless device within a primary (home) and/or secondary (roaming) network, independently and without having to interact with personnel of either network. Queries can comprise, for example, checking device availability, status, functionality, roaming history and/or device modem statistics. As used generically herein, the term query is used to denote the sending of, for example, a packet from one device (the querying device), attempting to "bounce" it off and/or receive a response from another device (the queried device), and "listening" for or receiving the reply. In one embodiment, a query as used herein is, for example, substantially similar to a Packet Internet Groper (PING) request in a TCP/IP network.

The queries can be executed via a PC by utilizing, for example, a commercially available user interface or other software program that enables or can be modified to enable the user to execute the queries without direct human assistance from the network provider. The query can also be executed via a wireless device having an appropriate user interface.

The querying device can query devices when they are in their home network, or roaming in a complementary network. That is, in one embodiment, the querying device is optionally unaware of the fact that it may be querying a device in a different network. In at least one embodiment of the present invention, the primary network is preferably a terrestrial network, whereas the secondary network(s) can be either a satellite network (e.g., NORCOM) and/or another terrestrial network (e.g., Bell Mobility Canada). The primary and/or secondary network can also transmit and/or receive messages to/from the Internet. Other networks may alternatively be used. Thus, with the present invention, a first communication device can query a second device that is optionally registered with, for example, at least two different networks, where the networks may optionally be using different data communication protocols. As used herein, a query can be, for example, any or all of determining device availability, status, functionality, and communication status, accessing device roaming or communication history and/or determining device modem statistics.

At least one embodiment of the present invention enables the primary network to look like a host to one or more complementary networks. In this embodiment, the querying and queried devices communicate and/or register with each of the primary and one or more secondary networks. For example, if the primary network is a U.S. based network, and a device normally residing in the U.S. travels to, for example, Canada, a device in the primary network can advantageously query the device in the secondary network.

The present invention provides, for example, an interface or input to the one or more complementary wireless networks, and appropriately formats the transmission headers of the query. In addition, the primary and or secondary network can also optionally have a TCP/IP connection to the Internet to provide access and/or interconnectivity thereto. The primary network interfaces to each of the one or more secondary networks, preferably as if it were a standard customer host to the secondary network. This host connection can be facilitated by a server or computer system that creates appropriate message transmission headers in accordance with the protocol used by each of the respective secondary networks. This enables the secondary network to interpret the headers, and subsequently route, for example, the query to the designated device. A queue manager within at least the primary network is preferably provided that keeps track of where the devices are located (e.g., in the primary network or a complementary network), and thus where the query should first be routed to reach each respective device in either the primary or a secondary network.

In the case of a user using a PC or host computer to issue a query from, for example, the Internet or the primary network to a device in a complementary network, the host computer may be, for example, a server associated with the primary network. If a device in the primary network queries a device in the complementary network, the complementary network will recognize that the queried device is registered thereto, and attempt to route the message to the designated device. Device queries can also be issued from, for example, the Internet to the primary and secondary networks. The subscriber unit (SU) will have an IP address, and the home network to which the SU is registered will map the IP address to the physical network address of the SU within the wireless network. The address mapping can in one embodiment be similar to the standard Address Resolution Protocol (ARP) used in a TCP/IP-based network or other standard mapping protocols.

In turn, devices in the complementary network can transmit data back or respond to the querying device within the primary network. The complementary network may have, for example, a gateway (or similar hardware and/or software) that enables a device within the complementary network to send a response to the querying device within the primary network.

In at least one embodiment, the present invention contemplates that queries are first routed to the last known network (e.g., the primary network or the secondary network) that the queried device was located. If the query cannot be successfully completed in that network, the query will then be routed to the other (or one of the other) complementary network(s) to which the queried device is registered. In the case of multiple complementary networks or in alternative embodiments of the invention, the query can be sent serially, to one complementary network at a time, or in parallel (e.g., substantially simultaneously to all complementary networks to which the queried device is registered).

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure and method as embodying features of the invention will be best understood when read in reference to the accompanying figures wherein:

FIG. 12 shows an exemplary screen shot resulting from a user executing a roaming history request; and FIG. 13 shows an exemplary screen shot resulting from a user executing a modem statistics request.

DETAILED DESCRIPTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 1:
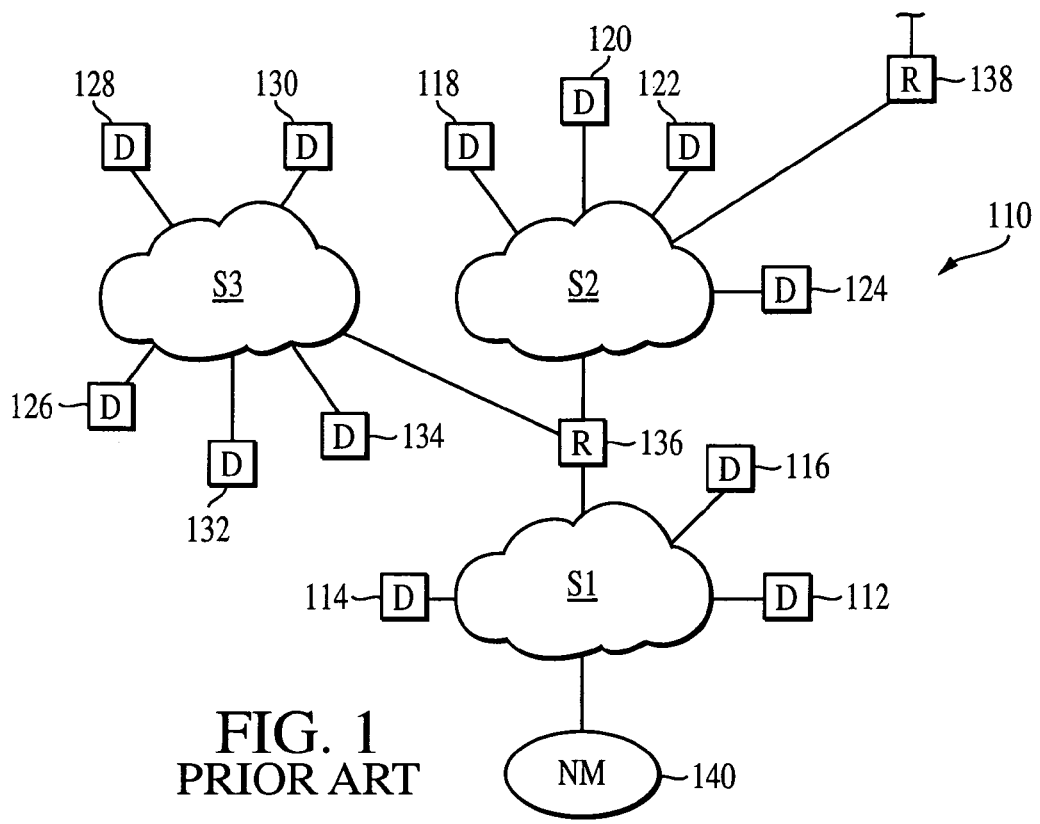
FIG. 1 is a prior art schematic diagram of a network including a network manager.
Figure 2:
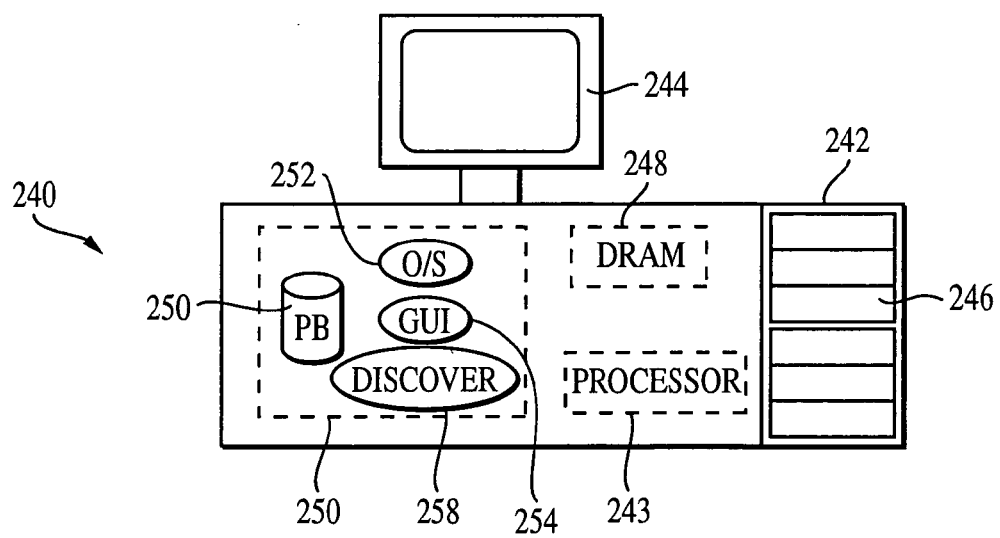
FIG. 2 is a prior art block diagram of an improved network manager.
Figure 3:
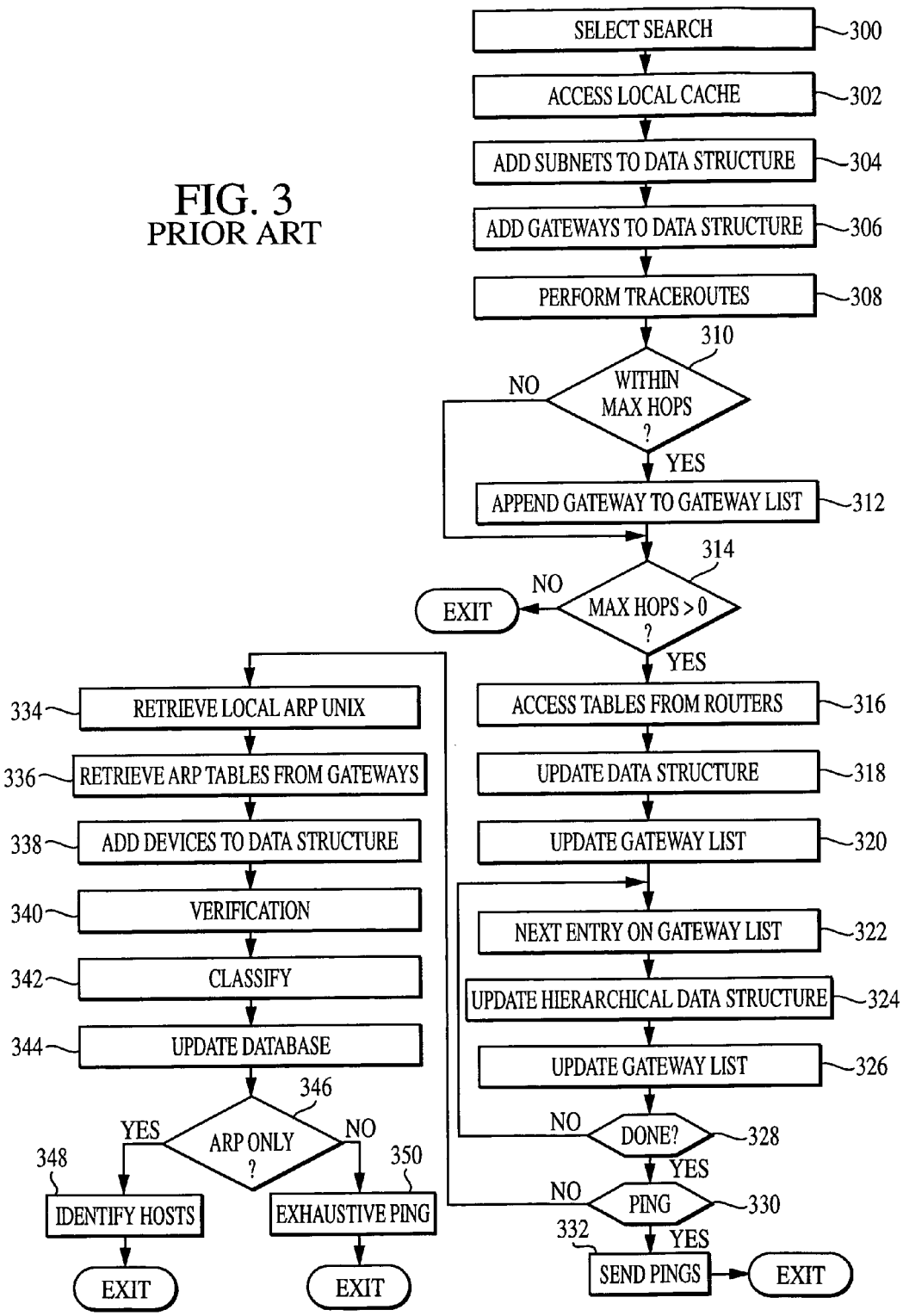
FIG. 3 is a prior art flowchart of a method of discovering devices on a network, the method being performed by the network manager of FIG. 2.
Figure 4:
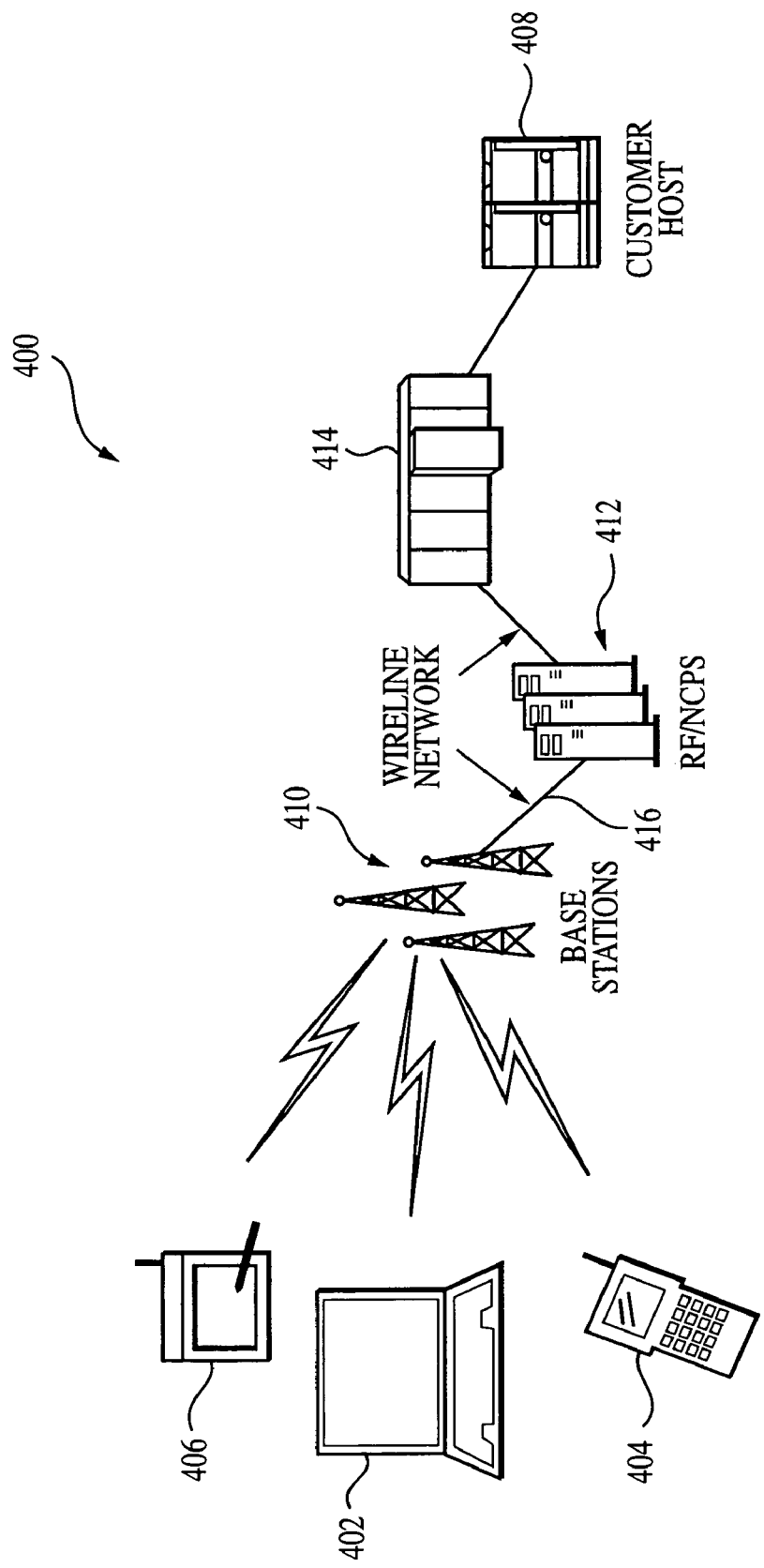
FIG. 4 is a schematically simplified representation of the Motient[SM] terrestrial communications network.

In accordance with the present invention, it is preferred that for terrestrial transmission a network such as the Motient[SM] network 400 (previously known as the ARDIS[SM] network) shown in FIG. 4 be utilized. Terrestrial networks of this nature provide secure, portable, two-way communication between, for example, wireless data terminals and/or mobile data terminals. Other networks capable of transmitting data may alternatively be used.

The Motient[SM] network 400 is a terrestrial wireless two-way data network that is based on the standard Motorola's Radio Data-Link Access Procedure (RD-LAP) technology. RD-LAP is a radio frequency (RF) protocol used for communicating between wireless devices 402, 404, 406 and base stations 410. It was originally developed and jointly owned by Motorola and IBM. In 1995 Motorola acquired 100 percent ownership of what was then called the ARDIS® (Advanced Radio Data Information Services) network. In 1998, ARDIS® was acquired by American Mobile Satellite Corporation (now Motient Corporation).

The Motient[SM] network 400 covers at least ninety percent of the urban business population and more than 400 metropolitan area in the United States, Puerto Rico and the Virgin Islands. Two standard air-interface protocols have been developed for the network 400. The standard Mobile Data Communications-4800 (MDC-4800) protocol provides a 4800 bit/sec service, and the standard RD-LAP protocol provides a 19.2 kbit/sec service.

The network 400 allows SUs such as an intelligent terminal or computing device 402, handheld device 404, and/or other communications device 406 to transmit and/or receive data messages. SUs 402, 404, 406 therefore, typically have a radio frequency (RF) modem for sending and receiving signals. The RF modem utilizes the MDC-4800 and/or RD-LAP protocols to enable SUs to gain access to the Motient[SM] network 400. In the event a network other than the Motient[SM] network 400 is utilized, other air-interface communication protocols may be used. For example, if a MOBITEX network is used, the air-interface protocol would utilize Gaussian minimum shift keying (GMSK).

The network 400 has over 1750 base stations (410) that provide service throughout the United States, Puerto Rico, and U.S. Virgin Islands. Each base station 410 covers a radius of approximately 15–20 miles. The base stations 410 are radio frequency towers that transmit or receive radio signals between SUs 402, 404, 406 and the Radio Frequency/Network Control Processors (RF/NCPs) 512. Base stations 510 transmit and receive radio signals, preferably using a narrow band FM transmitter and receiver operating in the 800 MHz frequency band. There are separate frequencies for the transmit path and the receive path; together these two frequencies represent a full duplex channel that normally transmits data at 4800 bps in both directions. Other standard transmission methods may alternatively be used in other standard communication systems.

In operation, for a message "inbound" to the network 500 from a SU 402, 404, 406, the signal is "heard" or received by the base stations 510 and sent over dedicated leased lines 516 to a RF/NCP 512. The network 500 employs an automated roaming capability that allows the free movement of SUs 402, 404, 406 between cities and between multiple channels within a given city. This capability allows the SUs 402, 404, 406 to freely move (roam) across the country and take advantage of all the network services that are available in every locale.

The RF/NCPs 412 are high-speed computers that interconnect multiple base stations 410 with the standard ARDIS® Connect Engine(s) (ACEs) 414. A number of RF/NCPs 412 are located together serving a particular geographical area, each being connected by high speed digital phone service to one of the ACEs 414, which route messages to a destination such as a customer host computer 408 that is directly connected to the network 400 by, for example, a leased telephone line or a value added network.

RF/NCPs 412 manage the RF resources, including the base stations 410 and data sent over the radio channels. Both inbound and outbound channels are managed using different delivery strategies. The RF/NCPs 412 evaluate the strength of the signal received from every wireless device transmission at each base station for each detected inbound data packet. Alternatively, the wireless device or the system may evaluate signal strength and report back to the RF/NCP 412. The RF/NCP then selects the best base station 410 to communicate with that particular wireless device and will send the next outbound message through that base station.

The RF/NCPs 412 also help manage the roaming capability of the network 400. SUs 402, 404, 406 can automatically move (roam) between any of the network 400 frequencies on either of the two protocols (MDC-4800 and RD-LAP 19.2), or between any of the configured network 400 layers that have been configured for in-building or on-street usage. Through periodic transmission of "channel marker messages," each SU 402, 404, 406 is provided with the most efficient service available in that area. Each RF/NCP 412 also passes information, via a high speed digital line, relating to source, destination and length of each message to an ACE 414 that enables the network 400 to do network analysis of traffic density at each base station 410.

An ACE 414, in turn, passes information back to a RF/NCP 412 concerning whether the SU 402, 404, 406 is properly registered to the network 400 and, if so, what level of service is provided to the respective subscriber 402, 404, 406. The ACEs 414 are general purpose computers that act as the heart of the network 400. The ACEs 414 route messages to the proper destination, store subscriber registration information including entitlement, and perform accounting and billing functions. The ACEs 414 also serve as a point of connectivity to, for example, host 408, perform protocol conversion, and perform network 400 troubleshooting and test functions. A plurality of ACEs 414 are interconnected through dedicated lines, with alternate paths available from each switch as a contingency measure against line interruptions. The linking between host 408 and an ACE 414 is generally accomplished using Transmission Control Protocol/Internet Protocol (TCP/IP), Systems Network Architecture (SNA), or X.25 dedicated circuits.

The wireline network 416 provides communication between the customer host computer 408, the ACEs 414, the RF/NCPs 412, and the base stations 410. The wireline network 416 is equipped with communications equipment that relays customer messages. This equipment includes intelligent multiplexers, leased telephone circuits, high-speed modems or digital service units, and modems for both RF/NCP 412 and host 408 connectivity. Accordingly, the various functionality performed by ACE 414 and the other one or more RF/NCPs 412, and base stations 410 may optionally be distributed in various parts/manners to those network components in accordance with alternative embodiments of the invention.

Inside every cell, the SUs 402, 404, 406 access the network 400 using, for example, a standard random access method called data sense multiple access (DSMA). Before every transmission, a SU 402, 404, 406 listens to a base station 410 to determine if the base station is busy. The SUs are allowed to transmit only when a base station 410 is not busy and/or have capacity to provide service.

Figure 5:
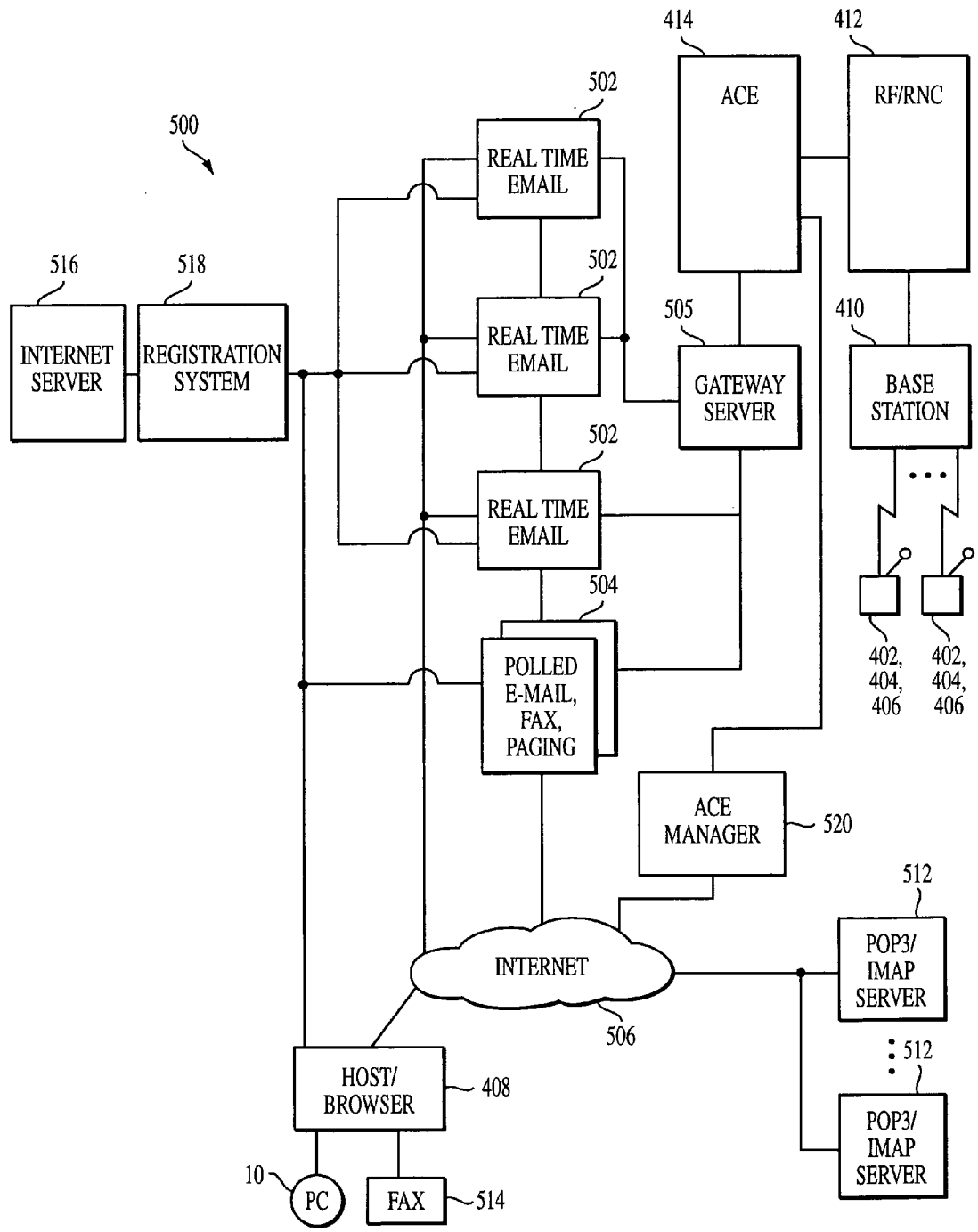
FIG. 5 is a simplified block diagram of the combined Agent/Messenger system.

Referring now to FIG. 5, a combined agent/messenger gateway system 500 is shown illustrating one architecture that utilizes and/or implements the present invention. The wireless devices 402, 404, 406, the base station(s) 410, the RF/RNC(s) 412, the ACE(s) 414, and the customer host(s) 408 are each as described in the Motient$^{SM}$ network described in FIG. 4. In addition, a plurality of messenger gateways 502 and agent gateways 504 are shown. In general, there can be one or more messenger gateways 502 and one or more agent gateways 504. The messenger 502 and agent 504 gateways are each connected, directly or optionally indirectly via, for example a gateway server 505, to an ACE 414. The gateways 502, 504 are also connected to a network 506 such as the Internet 506, and a registration system 518.

The registration system 518 contains the required profile for each user, as will be explained in further detail herein, and is preferably connected to an Internet server 516, which allows users to optionally modify user information such as times at which they wish their wireless device 402, 404, 406 to retrieve messages from a server 512. One or more customer host computers 408 are connected to the Internet 506, and may optionally be connected to a messenger gateway 502. Finally, one or more e-mail servers 512 are connected to the Internet 506.

One optional difference between the messenger gateways 502 and the agent gateways 504 lies with the addressing scheme. The messenger gateways 502 (and wireless devices 402, 404, 406 associated therewith) operate with their own unique Internet domain name, comprised of at least an organization's or an individual's name combined with a top level domain name. Top level domain names can include: a).com; b).net; c) org; d).edu; e).gov; f) mil; and g) .int. Other top level domain names can also be used as they become available (e.g., .biz, info, pro, etc).

In a preferred embodiment, the domain name is @2way-.net, although it will be readily recognized that domain names other than @2way.net can optionally be used. The end user has the option of what the <username> portion of the <username>@2way.net address will be, and can preferably change the <username> portion at any time in the registration system 518 via Internet server 516. The messenger gateways 502 thus preferably perform operations on messages having a domain name associated with the system 500 (e.g., in the case of the Motient$^{SM}$ network 400, an @2way.net domain name), whereas the agent gateways 504 preferably perform operations on messages having any domain name. Other methods of altering the functionality are also possible. For example, the functionality can be optionally distributed among the agent 504 and messenger 502 gateways as well.

The system 500 provides a wide variety of messaging services. For example, the messenger gateways 502 offer the power of two-way e-mail messaging, as well as optional facsimile (fax) and paging capabilities. Users can thus send messages to, for example, other wireless devices 402, 404, 406, to PC's 510 or similar devices via the Internet 506, as well as a text message to a fax machine 514. A wireless device such as a RIM™ 850 model wireless handheld device can be utilized to receive and/or transmit pages via the network 500. The handheld device can also be utilized to receive and/or transmit from/to the Internet 506 via, for example, gateways 502, 504 and/or ACE Manager 520. Similarly, other wireless devices having an IP address can also or alternatively be utilized to provide or facilitate direct access to the Internet 506.

In at least one embodiment, users who may use, for example, a POP and/or IMAP e-mail account(s) residing on, for example, a desktop/laptop PC 510 as their primary desktop e-mail are provided the convenience of utilizing a wireless device 402, 404, 406 to check their PC 510 account messages as will be discussed in further detail. The agent gateways 504 in conjunction with wireless devices 402, 404, 406 thus operate as an "extension" of, for example, a user's personal and/or corporate e-mail address/account. The agent gateways 504 preferably operate on a polled basis, checking, for example, a user's personal and/or corporate e-mail account when a user manually makes a request or automatically on a predetermined automatic basis (e.g., every 60 minutes).

Messaging Between Wireless Devices

The operation of the system 500 can be best described and illustrated by providing several examples. The system 500 can, for example, be used to send a message from one wireless device 402, 404, 406 to another wireless device 402, 404, 406. Although only two subscriber devices 402, 404, 406, are explicitly shown, any number consistent with network 500 capacity may be provided. The user inputs to his wireless device 402, 404, 406 the destination address of a secondary wireless device 402, 404, 406 to which he wishes to send a message. The message is then transmitted via a RF transmission to base station 410. Once received at a base station 410, the message is preferably transmitted via a wireline network to a RF/RNC 412, and then preferably transmitted to an ACE 414. At this point, depending on what the recipient's address is, the message is then routed, via a gateway server 505, to either a messenger gateway 502 or an agent gateway 504.

In the case of peer-to-peer messaging (e.g., where the originator and recipient of the message both subscribe to a same network such as the Motient$^{SM}$ network 400), the message is advantageously routed to a messenger gateway 502 and/or an agent gateway 504, without any substantial delay. Such a determination will generally be made by considering factors such as network traffic and loading of the respective gateways. Once received at either a messenger 502 and/or agent 504 gateway, the message is "turned around", without being routed through the Internet 506, and routed back through a gateway server 505, an ACE 414, an RF/RNC 412, a base station 410, and finally to a recipient wireless device 402, 404, 406.

Desktop to Wireless Device Messaging

Another type of message that can be transmitted by the system 500 is one that is initiated from a desktop e-mail system such as a PC 510, and destined for a wireless device 402, 404, 406. If the wireless device 402, 404, 406 has an @2way.net domain name, the message is routed over the Internet 508 to the wireless device 402, 404, 406 via a messenger gateway 502, gateway server 505, an ACE 414, a RF/RNC 412, and a base station 410. Optionally, direct connectivity of, for example, a host 408 to a messenger gateway 502 is possible. Here, the message is routed from the user's PC 510 via a customer host 408 to a messenger gateway 502, a gateway server 505, and then out through an ACE 414, a RF/RNC 412, and base station 410 for broadcasting to the wireless device 402, 404, 406. With either a standard transmission via a network such as the Internet 506 or via direct connectivity to a messenger gateway 502, the transmission path to a messenger gateway 502 is based on the fact that the message has been addressed to a predetermined address, e.g., <username>@2way.net address, which is the domain for the messenger gateways 502. Thus, in a preferred embodiment, an address originating from, say, a PC 510 and destined for a recipient having an e-mail address of the form <username>@2way.net address will be transmitted from the PC 510, through a messenger gateway 502, a gateway server 505, an ACE switch 414, a RF/RNC 412, a base station 410, and finally to the designated wireless device 402, 404, 406.

As previously noted, and as shown, both the agent gateways 504 and the messenger gateways 502 advantageously have direct connection to the Internet 506. However, other embodiments in the present invention provide that the messenger gateways 502 and/or agent gateways 504 receive the messages from other modules or components in the system. For example, an agent gateway 504 may have direct connectivity to the Internet 506 and transfer messages to a messenger gateway 502, and/or vice versa.

Retrieving Messages from Another Account

Another example of a message transmission involves the use of a wireless device 402, 404, 406 to retrieve messages from, for example, a user's POP3 and/or IMAP 4 e-mail account residing on, say, a PC 510. Here, the wireless device 402, 404, 406 is preferably configured to poll the user's e-mail mailbox residing on, for example, a POP and/or IMAP server 512 at a fixed time or time interval (e.g., 5:00 P.M. and/or every 35 minutes). Alternatively, the wireless device can poll the user's server 512 when manually directed to so by the user by, for example, clicking a "Get Mail" icon. In either case, an agent gateway 504 can access the user's mailbox residing on a server 512 via a network such as the Internet 506, pull any message therein, and store them on an agent gateway 504. The messages can then be routed via gateway server 505 to ACE 414, RF/RNC 412, base station 410, and then to the user's wireless device(s) 402, 404, 406 that has the address associate with that particular mailbox. This addressing and mapping of the user's wireless device 402, 404, 406 to the user's POP and/or IMAP e-mail account(s) is preferably done through the registration system 518, which contains the required profile for each user.

The agent gateways 504 thus merge a user's Internet 504 e-mail mailbox residing on a server 512 with the wireless device 402, 404, 406 to retrieve, either automatically on a predetermined basis or manually as directed by the user, mail from the user's POP and/or IMAP e-mail account(s). The agent gateway 504 thus enables a user to utilize the same e-mail address as their POP and/or IMAP e-mail account. This also allows a user to, for example, respond to received e-mail messages from their wireless device 402, 404, 406 such that the messages look like they are being sent from the user's PC 510. In a preferred embodiment, any messages sent from a wireless device 402, 404, 406 are duplicated into a user's "Sent Mail" folder on server 512 when using the IMAP.

The system 500 allows users to have, for example, two e-mail accounts: one that utilizes a messenger gateway 502 to send and receive messages substantially immediately, and one that utilizes an agent gateway 504 for sending and receiving messages on a polled basis. The user can provide e-mail addresses associated with the respective accounts to various people, thereby providing enhanced flexibility as to how soon messages are received. Optionally, the agent gateways 504 and/or messenger gateways 502 allow a single user to hold two or more e-mail accounts (e.g., a work account and/or a personal account), and route e-mail from either or both accounts to a single wireless device 402, 404, 406.

Having these two e-mail addresses allows a user, for example, to not be interrupted by messages coming through an agent gateway 504. This feature is provided by allowing the user to optionally and advantageously select when he wants to receive his messages. For example, the user can specify that he only wants to receive messages, for example, when he logs on and downloads them, or at a particular time (e.g., 5:00 P.M.). In such a case then, if the user is in a meeting at 2:00 P.M., he would then know that the message he has received is a message sent via a messenger gateway 502.

In a corporate setting, an employee who has a wireless device 402, 404, 406 and does not want, need, or currently have access to a corporate e-mail account can utilize the wireless device 402, 404, 406 in conjunction with his home e-mail system. Alternatively, employees who are away from the office may use a wireless device 402, 404, 406 to receive messages via a messenger gateway 502, particularly if they do not have either a home or work e-mail account from which they can retrieve their messages via an agent gateway 504.

Paging Service

The paging service operates in manner similar to the e-mail service. As previously noted, it is preferred that a wireless device such as a RIM™ 850 model be utilized, which can also receive and/or transmit pages via the network 500. Thus, depending on whether the user, via the registration system 518, sets the page up to utilize an agent gateway 504 and/or a messenger gateway 502, the user can receive pages on either a real time and/or polled basis. Specifically, if the user chooses via the registration system 518 to have page messages utilize a messenger gateway 502, the user will receive pages via the wireless device 402, 404, 406 on a real time basis. Similarly, if the user chooses via the registration system to have page messages utilize an agent gateway 504, the user will receive pages on a polled basis, as determined by the user.

In a preferred embodiment, a page intended for a wireless device 402, 404, 406 is generated from a standard numeric paging system such that when that message goes out to either the messenger gateway 502 or agent gateway 504, the page message looks like an e-mail message that is addressed to a wireless device 402, 404, 406 having an address of the form <username>@2way.net domain name. The text of the message will be the numbers that were keyed through the numeric paging system.

Facsimile Service Via Agent Gateway

Advantageously, the network 500 enables a user to optionally transmit a facsimile from a wireless device 402, 404, 406 to a facsimile device 514. By connecting the agent 504 and messenger 502 gateways together, a facsimile message can be transmitted from a wireless device 402, 404, 406 to a facsimile device 514 via a transmission path that includes a messenger gateway 502 (which does not have a faxing capability) and an agent gateway 504 (which does have a faxing capability). From a functional standpoint, the capability of the agent gateways 504, which are polling gateways that include functionality that enable facsimile transmissions, are advantageously combined with the messenger gateways 502 used by wireless devices 402, 404, 406.

In operation, a wireless device 402, 404, 406, originates a facsimile message for a device 514. When a phone number for the facsimile device 514 is entered in the wireless device 402, 404, 406, the message is transmitted to a base station, an RF/RNC 412, an ACE 414, and subsequently to a messenger gateway 502. Since messenger gateways 502 do not have facsimile functionality in one embodiment of the invention, messenger gateways 502, which are operatively communicable with an agent gateway 504, transmit the facsimile message to an agent gateway 504. An agent gateway 504 then transmits the facsimile message to the facsimile device 514 via, for example the Internet 506. The facsimile transmission path can optionally include, for example, a customer host 408. Other architectures may optionally be used for transmitting a message to a facsimile device, for example, directly via one of the gateways, and the like.

Figure 6:
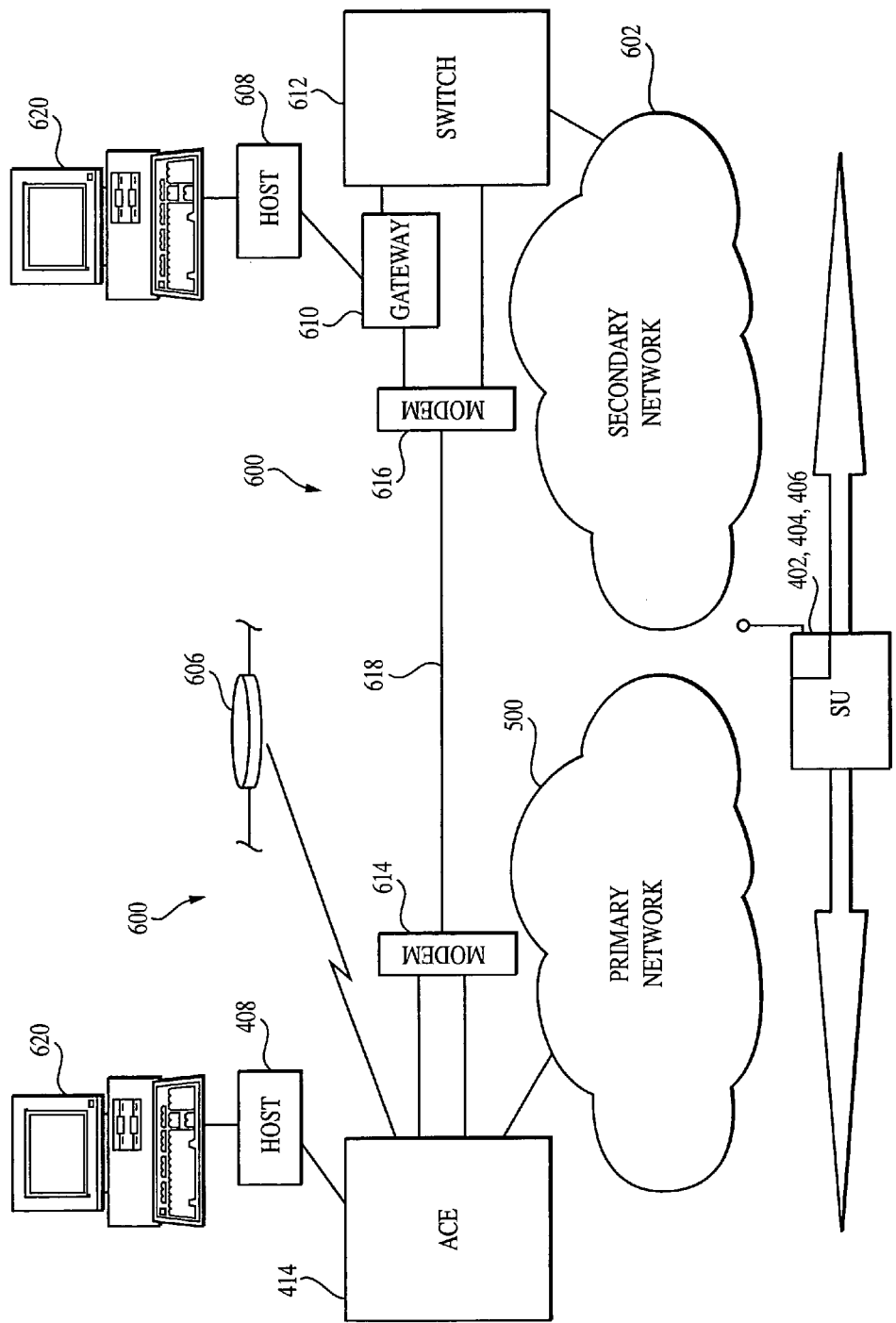
FIG. 6 is a schematically simplified representation of a complementary network system.

Referring now to FIG. 6, a high level architecture of the system 600 in accordance with the present invention is shown. ACE 414 allows a SU 402, 404, 406 to be registered to a plurality of networks or complementary networks (e.g., a primary terrestrial network 400, a secondary terrestrial network 602, and/or a satellite network 606). The primary network can be, for example, the Motient$^{SM}$ network 400, the secondary network 602 can be, for example, the Bell Mobility network, and the satellite network 606 can be, for example, the NORCOM satellite network. Other networks may alternatively, or in addition, be used. The primary and secondary network(s) each preferably have at least one host computer 620 that is connected to a host 408, 608. The hosts 408, 608 may also be optionally connected via modem 614, 616, respectively. Switch 612 preferably has a functionality substantially similar to the ACE 414, which will be described herein. Modems 614, 616 can be utilized to connect the primary network 400 and secondary network 602 via, for example, landline 618. PCs 620 are generally connected to a host 408, 608 which, in turn, facilitate transmission of and/or reception of device queries (e.g., to determine device availability, access device roaming history and/or determine device modem requests) within or between networks 500, 602. SUs 402, 404, 406, however, can transmit and/or receive device queries without being connected to a host 408, 608 by using, for example, the Motient$^{SM}$ network 400 or a similar network.

Figure 7:
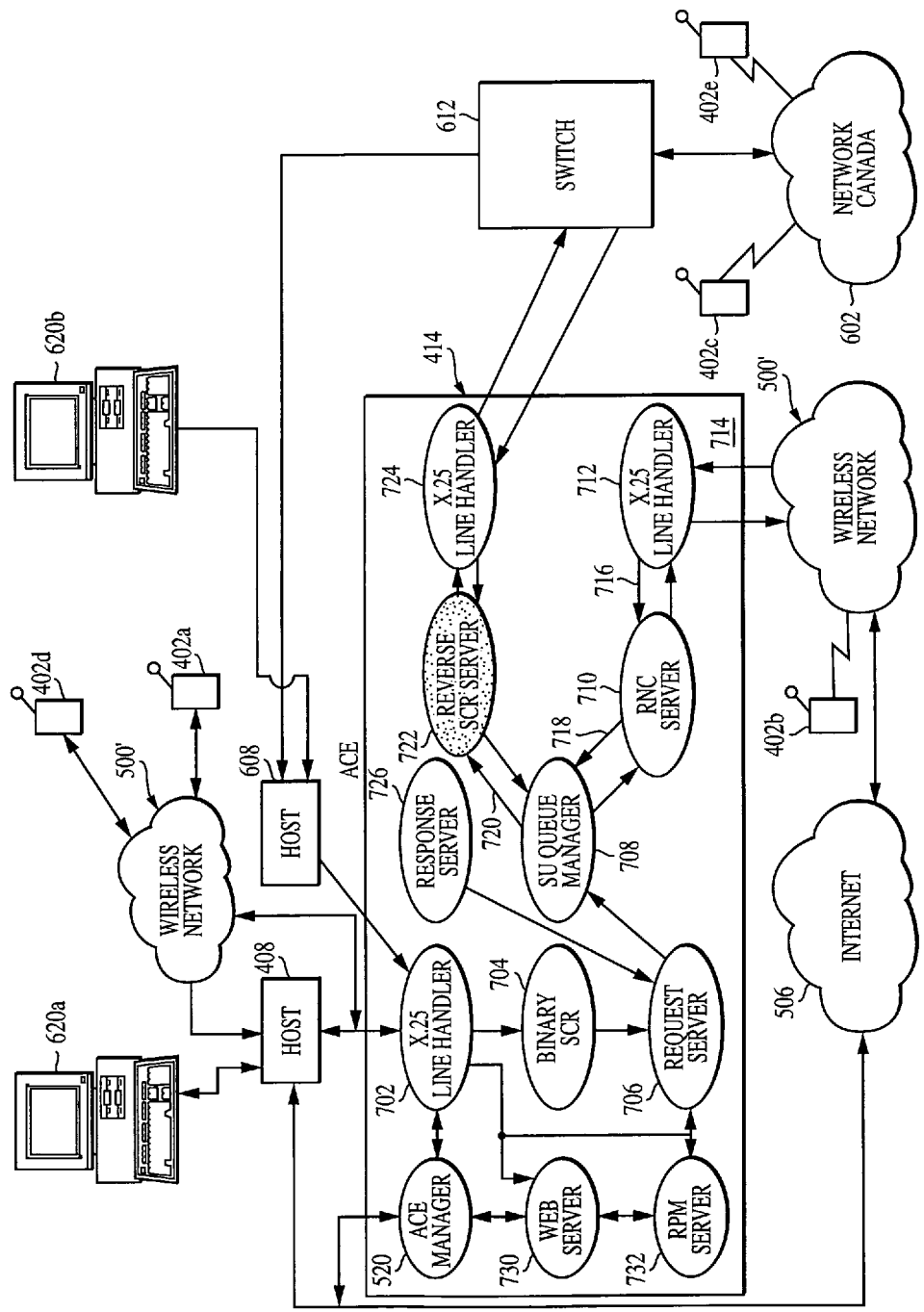
FIG. 7 is a representative simplified block diagram of a primary and a secondary network, which also illustrates an overview of the method according to the present invention.

Referring now to FIG. 7, a more detailed architecture of the system 600 (and environments thereof) as contemplated by the present invention is shown. FIG. 7 also illustrates the manner in which users can query devices (e.g., SUs 402, 404, 406 and/or PCs 620) to determine, for example, whether or not a particular device is currently in service.

Figure 11:
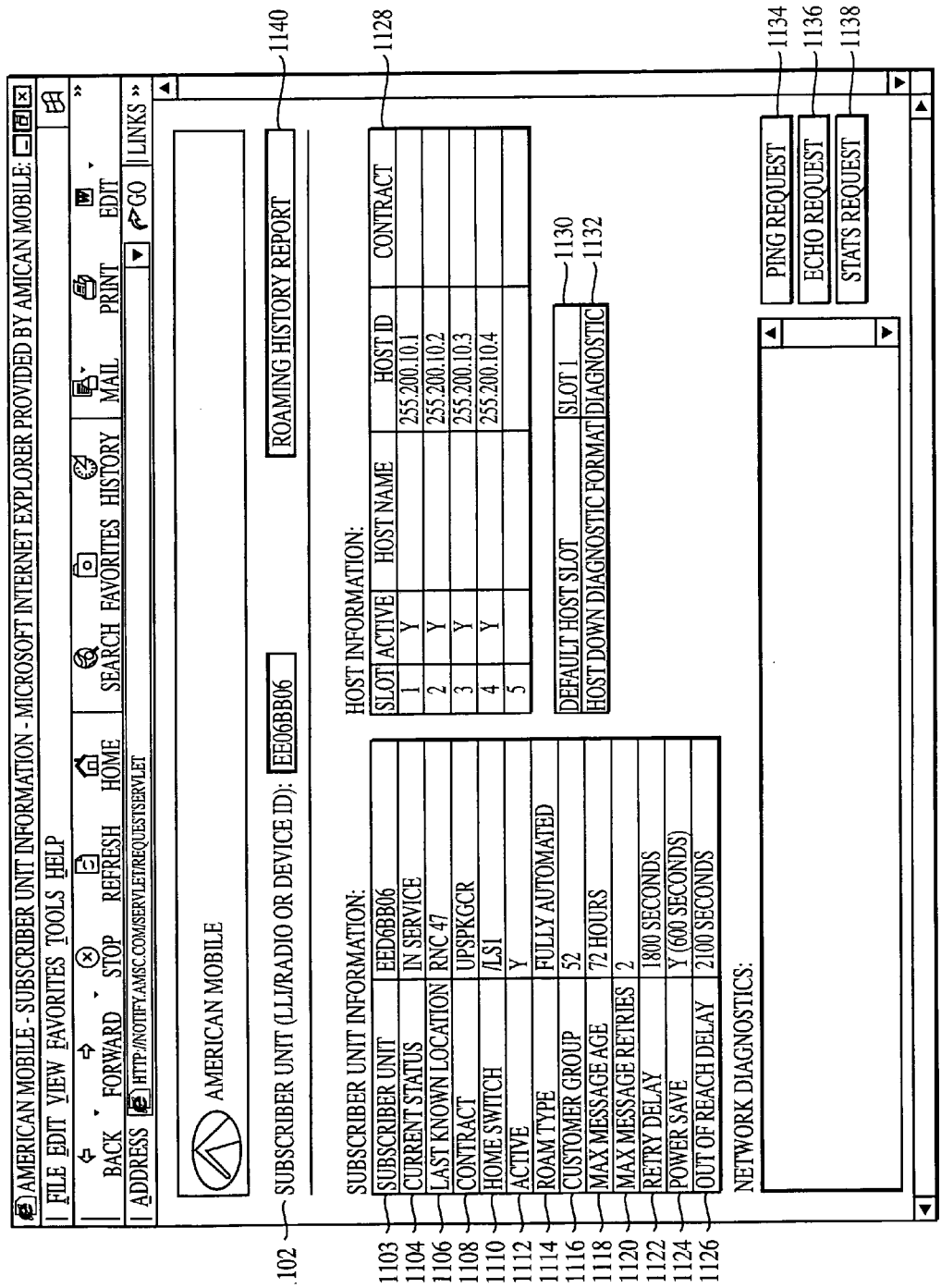
FIG. 11 shows an exemplary screen shot that a user can use to initiate, for example, a ping, roaming history, and/or modem statistics request.

A SU 402, 404, 406 that roams between the primary network 500, the secondary network 602, and/or a satellite network 606 will preferably be registered using standard procedures and/or real-time via standard identification procedures with each respective network. Wireless networks having an architecture other than that of system 500 can also be utilized. SUs 402, 404, 406 and PCs 620 are each preferably assigned a unique alphanumeric identifier associated with the home network such as a device ID 1102 as shown in FIG. 11. The SUs 402, 404, 406 and/or PCs 620 can also have a IP address. The connection of the ACE 414 to switch 612 is perceived by the secondary network 602 as it would any other supported connection (e.g., X.25). That is, in accordance with one embodiment of the present invention, it is preferred that the ACE 414 appear as a host to a switch 612 (or equivalent thereof) of a complementary network (e.g., 602 and or 606).

In operation, it is preferred that a user operating a device in the primary network 500 initiate a device query via a PC 620a operationally connected to the host 408, or via a SU 402, 404, 406 using any of the network 500 supported line protocols (e.g., X.25). The host 408 can be operationally connected to the ACE 414 to access the system via, for example, line handler 702. The host 408 can also optionally serve as a gateway to the Internet 506 to provide access thereto.

A SU 402a can query a PC 620a via the wireless network 500' and host 408. SU 402 can also query PC 620a via the Internet 506 using, for example, the Wireless Access Protocol (WAP) in conjunction with network 400 protocols. Wireless network 500' generally comprises system 500 elements such as, for example, base stations 410 and RF/RNCs 412 shown in FIG. 5 (but not shown in FIG. 7). In a configuration where the host 408 is connected to ACE 414 but not to the Internet 506, SU 402*a* can query PC 620*a* via the host 408 using, for example, a user interface such as shown in FIG. 11. Similarly, a SU 402*a* via system 500 can query a second SU 402*b*.

In the case of a PC 620*a* using ACE 414 to query a SU 402*b*, the line handler 702 passes the query to an appropriate protocol converter which, in this example, is a binary Standard Context Routing (SCR) 704 converter. Binary SCR can be used in host based routing when a SU 402, 404, 406 sends messages to and/or receives messages from a PC 620*a* connected to a host 408, which can be, for example, a mainframe computer, mini computer, micro computer, and the like. Host based routing is generally used for applications which require a central repository of information or on-line service. This type of routing assumes that the host 408 is in a fixed location and that the host 408 application(s) compliments the client application—usually by providing more complex processing. It is preferred that the host 408 is connected to the ACE 414 through one of a variety of supported protocols (for example Systems Network Architecture (SNA) Logical Unit (LU) 6.2 or X.25). The physical connection to the ACE 414 can be, for example, a leased line or other communication line. If host routing is not used, then a first SU 402*a* can route a query to PC 620*a* (and vice versa) without using the Internet 506.

The line handler 702 is also operationally connected to ACE Manager 520, which can optionally be used to produce the illustrative screen shots provided in FIGS. 11–13, which are generally used for a PC 620. ACE Manager 520 can also be used to produce corresponding Wireless Access Protocol (WAP) browser displays for a SU 402, 404, 406 using, for example, the Windows CE operating system. WAP is the wireless standard for providing most cellular phones with access to e-mail and text-based Web pages. WAP uses the Wireless Markup Language (WML), which is the WAP version of Hand-held Device Markup Language (HDML). HDML, in turn, is an abbreviated version of HyperText Markup Language (HTML) designed to enable wireless pagers, cell phones and other handheld devices to obtain Web pages. ACE Manager 520 can also maintain SU 402, 404, 406 registration that includes identification of network services and billing information, and also serve as a gateway to the Internet 506 as shown and discussed with regard to FIG. 5.

Web Server 730 can be used to run middleware (e.g., software that functions as a conversion or translation layer) such as WebSphere® from IBM Corp., Armonk, N.Y. In the present invention, the middleware comprises software that can mediate between, for example, a WAP browser running on a handheld SU 404 via the network 500 and the Internet 506, and the operating system and various network control programs and protocols comprising ACE 414. Middleware can also optionally exist on, for example, a handheld SU 404.

Radio Packet Modem (RPM) server 732 preferably processes all RPM requests that are directed to and/or originated from a SU 402, 404, 406 RF modem, including device status requests, echo requests, roaming information requests, and/or modem statistics, whether originated from a PC 620 or another SU. In processing RPM requests, the RPM server 732 maintains a log of what device originated the device query (e.g., PC 620*a* or SU 402*a*), and what device the query is directed to (e.g., SU 420*b*). RPM Server 732 also preferably processes SU 402, 404, 406 status information requests (as will be discussed with regard to FIGS. 11–13), as well as RPM requests associated with, for example, e-mail messages directed to SUs 402, 404, 406.

When a PC 620*a* via host 408 queries a SU 402*b*, SCR can optionally be used for routing the device query through the ACE 404 and other primary network 500 elements. SCR is an application header which flows between, for example, hosts 408, 608 and the ACE 414, as well as between the host 408 and other network 500 elements such as RF/NCPs 412. The header is preferably placed at the beginning of the user query/data. SCR provides for message control and delivery acknowledgment, and can be used with the SNA LU 6.2 from IBM Corp, Armonk, N.Y., and X.25 protocols. Other standard application headers or techniques may alternatively be used that performs or provides the host routing functionality and/or data described herein.

It is preferred that there are at least three types of standard SCR message headers: Basic Inbound (IB), Basic Acknowledgement (AB), and Basic Outbound (BO). The 113 header is preferably created in the customer host 408, 608 application software or communications software and flows from the customer hosts 408, 608 to, for example, the ACE 414. Thus, in accordance with the present invention, a host 608 from a secondary network 602 can also send a SU query to a SU 402*b* registered with the primary network 500, which then directs the SU query to the appropriate SU (e.g. 402*b*).

The AB header is created by the network 400, and in accordance with at least one embodiment of the present invention, is sent to host 408, 608. An AB header notifies host 408, 608 that the query sent to a SU 402, 404, 406 was successfully delivered. Finally, the OB header is preferably created by the network 600 for messages sent to host 408, 608 from a SU 402, 404, 406. Further information pertaining to the SCR protocol and the Motient$^{SM}$ network can be found in the following documents: *ARDIS Network Connectivity Guide*, June 1994; *DataTAC® Wireless Data Networks: Application Development Guide* (Doc. No. 6804111L20-A), First Edition, November 1997; *DataTAC® Open Protocol Specifications Standard Context Routing Release* 1.0 (Doc. No. 68P04025C20-A), November 1995); *ARDIS DataTAC® 4000 Software Developers Reference Guide*, Revision 2.0, January 1997; DataTAC® 5000 System, Application Programmer's Guide, Release 6.1. Each of the aforementioned documents are incorporated herein by reference in their entirety. Copies of these documents are submitted herewith and attached as appendices. Other standard message headers may alternatively be used providing the functionality and/or data described herein.

At 704, the SCR header is removed if a SU query was sent to ACE 414 via a host 408, 608, and an internal network 600 control header is added. The device query is forwarded to a request server 706, which reads the profile of the queried device, and the primary and secondary network (e.g., network(s) 500 and/or 602 and/or 606) information is then added to the internal ACE 414 header. The request server 706 can read the SU 402, 404, 406 registration information from either the ACE Manager 520 where, as previously noted, it is stored, or from a locally maintained copy. As will be subsequently discussed, the user can specify the specific queried device, groups of devices and/or all devices via a exemplary user interface such as shown in FIG. 11.

The device query is then routed to a SU queue manager 708, where the query is queued. If no other device queries (and/or other messages) are queued for delivery, the SU queue manager 708 routes the device query to the RNC Server 710, which adds the appropriate RF header for RF transmission, and routes the message to the configured X.25 line handler 712 corresponding to the RF/NCP 412 (not shown) associated with, for example, the home location of the queried device, which can be stored in either ACE Manager 520 along with other registration information, or locally at request server 706. As shown in FIG. 4, the ACE 414 is actually a part of the Motient$^{SM}$ network 400. Here, the ACE 414, via line handler 712, transmits the message to, for example, a RF/NCP 412.

If, after a predetermined number of attempts the device query cannot be delivered and/or the device is not responding, the network 400 returns, for example, a Negative Acknowledgement (NAK) 714 message to the X.25 line handler 712. The line handler 712 then routes (indicated by arrow 716) the NAK 714 back to the RNC server 710, where the RF Header is removed.

The RNC Server 710 then optionally routes the return message back to the SU queue manager 708, where the original message was queued. SU queue manager 708 then routes the SU query to secondary destination such as a complementary network 602. In this case, the SU query is routed to reverse SCR server 722, which adds appropriate headers to the query so that the primary network 500 looks like a customer host to the complementary network 602 and/or 606.

Specifically, the reverse SCR server 722 preferably adds the appropriate 11B SCR message header appropriate to the complementary network 602, and forwards the query to the configured X.25 Line Handler 724, which can transmit the query to, for example, switch 612, which preferably views the ACE 414/line handler 724 connection as it would a standard host connection. Switch 612 can then route the device query to the network 602 as it would route, for example, any other message/query to the queried device 402b. The response server 726 is operatively communicable with the request server 706, and manages any ACK and NAK messages between the primary network 500 and any complementary network(s) 602. Other specific message/query transmissions may optionally be used to determine device status, availability, and the like, as described herein.

Also in accordance with the present invention, a device (e.g., SU 402c and/or PC 620 (not shown)) in a complementary network 602 and/or 606 can also query a device in the primary network 500. In this case, the complementary network 602 and/or 606, in effect, becomes functionally equivalent to the primary network 500. As such, switch 612 (or equivalent thereof) may need to be physically and/or logically modified to provide functionality similar to, or substantially similar to, the ACE 414. That is, when a device (e.g., 620a) in the primary network 500 transmits a query to a device (e.g., 402c) in the secondary network 602 or 606, no (or minimal) modification of the secondary network(s) 602 and/or 606 are required since the primary network 500 appears as any other host would to the secondary network(s). However, when a device (e.g., 402c) in the secondary network 602 and/or 606 queries a device (e.g., 402a) in the primary network 500, the secondary network 602 may be required to have functionality similar to the ACE 414 to enable a device to, for example, transmit a query from the designated secondary network (e.g., 602) to one or more other networks (e.g., 500 and/or 606).

Device queries can also be sent from a first SU 402a to a second SU 402c within the primary network. In this case, SU 402c could provide relevant or detailed feedback (instead of a NAK as described above with regard to the complementary network 602) through ACE 414 pertinent to the particular query issued by SU 402a, as will be discussed with regard to FIGS. 11–13. In this case, the query is not routed through a host 408. Conventional protocols utilized by the primary network 500 can be utilized, without, for example, utilization of the host 408 based SCR protocol. For example, when a device 402a does not use a host 408 to query a second device, the Binary SCR Server 704 and/or the Reverse SCR Server 722 can utilize, for example, the wireless Message Generator (MG) application user header, as described in the above-referenced *ARDIS DataTAC® 4000 Software Developers Reference Guide*, Revision 2.0, January 1997. Similarly, the Reverse SCR Server 722 can convert from a first RF protocol used by the primary network to a second RF protocol used by the secondary network 602 and/or 606, and/or utilize the second RF protocol when transmitting to the secondary network 602 and/or 606. The reverse SCR server would then route the message back through the SU queue manager 708, the RNC server 710, line handler 712, and elements associated with the network 500' before transmitting it to a base station (not shown) associated with complementary network 602.

A host 608 associated with complementary network 602 can be provided direct access to ACE 414 via, for example, line handler 702. This advantageously enables a user using computer 620b via complementary network 602 to query a SU 402a in the primary network 500 in essentially the same way as computer 620a associated with the primary network 500. This is possible because once a host 608 of a complementary network 602 is provided access to ACE 414, ACE 414 views the host 608 as it would a host 408 associated with the primary network. Accordingly, computer 620b can utilize ACE 414 to, for example, check device availability, check device roaming history and/or check modem statistics of a SU 402a by utilizing the same sequence of events within ACE 414 as described above with regard to computer 420a.

If a SU 402, 404, 406 in the primary network 500 substantially covering, for example, the United States, queries a SU 402, 404, 406 in the secondary network 602 substantially covering, for example, Canada, the secondary network switch 612 (or equivalent) will recognize that the queried SU 402, 404, 406 is registered in Canada. The secondary network switch 612 can then transmit the SU query to the intended SU (e.g., 402c) via the normal secondary network 602 transmission process.

Another embodiment of the present invention contemplates the use of a bridge connection between the primary 500 and secondary 602 networks, so that the interface that connects the respective primary network 500 and secondary network 1102 to the bridge have the same address. In this regard, a bridge can be viewed as a device that connects two LAN segments together, which may be of similar or dissimilar types (e.g., Ethernet and Token Ring). In this embodiment, bridges are optionally inserted into a network to improve performance by keeping traffic contained within smaller segments. Bridges preferably maintain, for example, address tables of the nodes on the network through experience. A standard function of a conventional bridge is that it will learn which addresses were successfully received through which output ports by monitoring which station acknowledged receipt of the address. Other factors being equal, bridges are typically faster than routers because bridges do not have to read the protocol to glean routing information. Bridges with more than two ports (e.g., multiport bridges) can optionally perform a switching function between respective portions of a network.

A SU 402c associated with complementary network 602 can query a SU 402a and or PC 620a in the primary network 500 in essentially the same way as computer 620a associated with the primary network 500. This embodiment assumes that the switch 612 of the complementary network has the same or similar functionality as the ACE 414. Accordingly, SU 402c can check device availability, check device roaming history and/or check modem statistics of, for example, SU 402a by utilizing the same sequence of events within ACE 414 as described above with regard to SU 402a checking device availability, roaming history and/or modem statistics of SU 402c. Specifically, host 608 receives a SU query from a SU 402c (and/or PC 620b) in the secondary network 602. The host 608, like host 408, may also optionally be connected to another network such as the Internet 506. Once the host 608 receives the SU query, the host 608 queries the intended SU 402b in the primary network 500 via ACE 414 as previously discussed.

Figure 8:
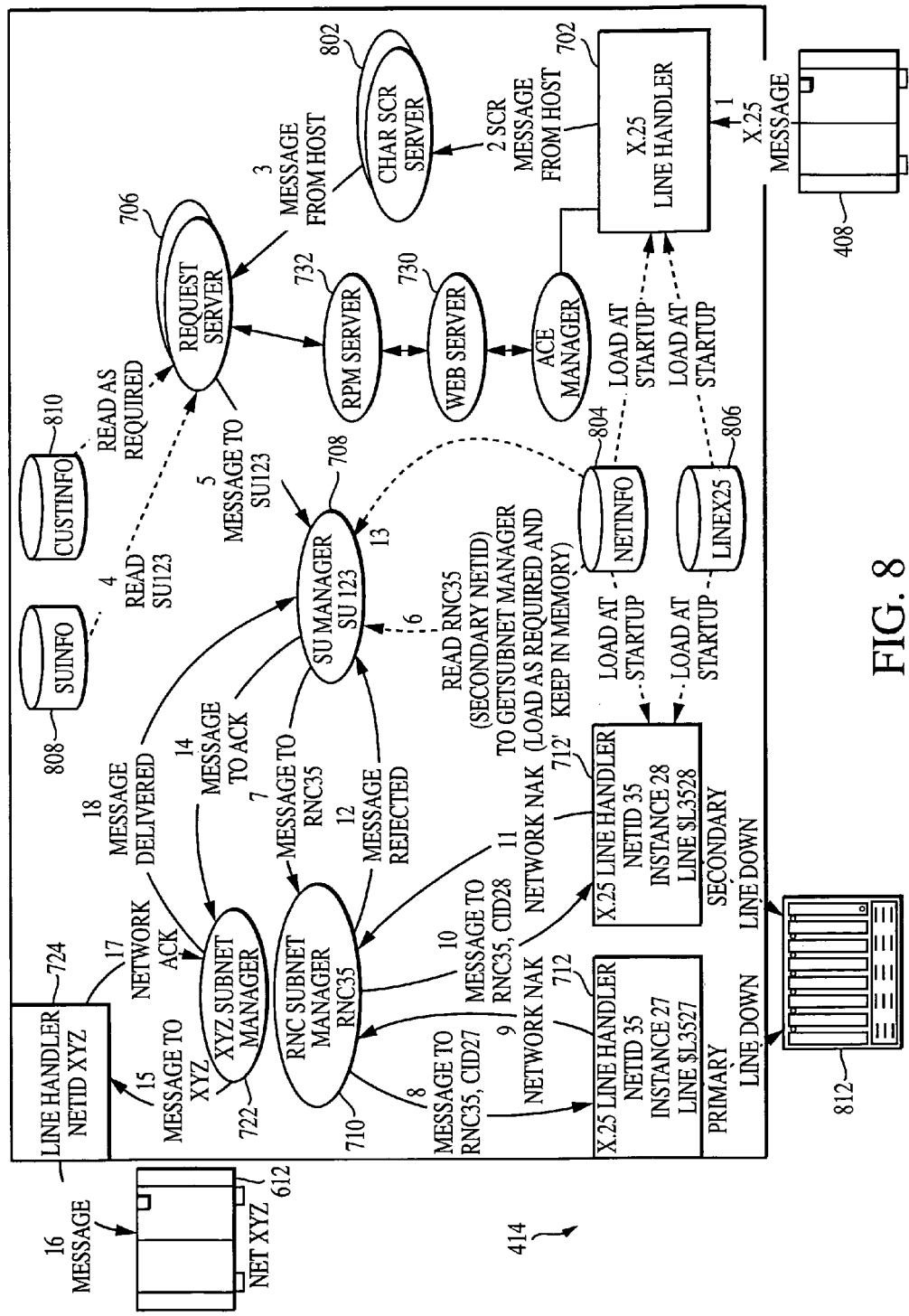
FIG. 8 is another embodiment of the network message flow and switching features shown in FIG. 7.

FIG. 8 shows another embodiment of the network routing and switching features of ACE 414. As indicated above, host 408 may be, for example, a mainframe computer, mini computer, micro computer, and the like. It should be understood that a query can also enter the ACE 414 from the network 400 via normal message transmission as discussed with regard to FIGS. 5 and 7. The normal flow from host 408 occurs when a X.25 line handler 702, for example, detects an incoming query (1). Other line handlers can also be provided (e.g., TCP/IP line handlers, SNA LU 6.2 line handlers, and the like). Line handler information is preferably loaded as needed from database 806. Similarly, network information is also preferably loaded at startup via NETINFO database 804. The line handler 702 generally determines which protocol(s) the host 408 uses to communicate with the ACE 414. For example, as previously discussed, the host 408 can communicate with the ACE 414 through either character SCR or binary SCR, which are protocols that allows the host 408 to, for example, query the receiving/destination SU.

The ACE manager 520, web server 730, and RPM server 732 are also shown, each having the functionality as described with regard to FIG. 7. For example, ACE Manager 520, can be used to produce the illustrative screen shots provided in FIGS. 11–13 for querying devices 620a and/or 620b. ACE Manager 520 can also optionally maintain SU 402, 404, 406 registration that includes identification of network services and billing information for each respective SU. Web Server 730 can be used to run middleware to mediate between, for example, ACE 414 and computer 620a and/or 620b. RPM server 732 preferably can process radio packet modem requests that are directed to and/or originated from a SU's 402, 404, 406 RF modem, including device status requests, echo requests, roaming information requests, and/or modem statistics, whether originated from a PC 620a or another SU.

Character SCR server 802 reads the device query (2) and associated SCR headers to determine what SU 402, 404, 406 the SU query is to directed to. Request server 706 receives the device query (3) and ensures that the desired SU 402, 404, 406 exists (4). In one embodiment, such information can be stored, for example, in one or more databases. For example, the SUINFO database 808 can store all valid SU identification numbers (IDs) that can be entered, for example, via PC 620a using an exemplary screen display shown in FIG. 11. The CUSTINFO database 810 can store the type and level of service provided to each customer and/or SU, and/or data pertaining to usage fees and/or billing (6). The request server 706 also ensures that the host computer 408 is operationally communicable with the intended SU 402, 404, 406.

The SU queue manager 708 determines which network(s) (e.g., network 500 and/or 602 and/or 606 shown in FIG. 6) the SU 402, 404, 406 to be queried is registered to. Each SU 402, 404, 406 can be registered with one or more networks. The SU query is transmitted (5) to the SU queue manager 708, and network information such as the home RF/RNC 412 of the SU is read (6). The query is then transmitted (7) to a RNC server 710, which may, for example, place appropriate transmission headers on the query. The query (8) is then sent to the network 500 via, for example, an X.25 line handler 712 (or 712'). More than two line handlers may be provided. It is also preferred that when two or more line handlers are provided (e.g., line handlers 712 and 712'), they receive/transmit queries (and/or messages such as e-mails) on a round-robin basis, so that there is substantially equal traffic passing over line handler 712, 712'. As shown, the line handlers 712, 712' are operatively connected to and communicable with the RNC subnet manager 710 and host 812.

In the event the intended SU 402, 404, 406 is not available and/or not responding, the RF/RNC 412 will send a NAK (9) to the primary X.25 line handler 712 and subsequently to the RNC server 710. In the event that the primary line handler is down, the message can be sent via a secondary line handler 712' (10). In the event the queried SU 402, 404, 406 is not available and/or not responding, the RF/RNC 412 can send a NAK (11) to the secondary X.25 line handler 712' and subsequently to the SU queue manager 708 (12).

The SU queue manager 708 receives notification (12) that the query has been unsuccessful (by, e.g., receiving a NAK message), and determines other available alternatives to query the intended SU. Once another network 602 is identified from, for example, database 808 (13), the SU queue manager 708 sends the message to the reverse SCR server 722 (14) which places the SU query into the protocol that is utilized by the complementary network 602. The SU query is then transmitted (15) by, for example, an X.25 line handler 724 (16) to, for example, a switch 612 associated with the complementary network(s) (shown in FIGS. 6 and 7), and subsequently to the complementary network 602. It is preferred that the complementary network 602, via switch 612, send an acknowledgement (ACK) message (17, 18) back to the primary network 500 that indicates that the SU (e.g. 402c in FIG. 7) in the complementary network 602 has been successfully queried. In the event that the SU query is not successfully delivered, the SU queue manager 708 can repeat the process with the same or another complementary network that the queried SU 402, 404, 406 is registered to.

Figure 9A:
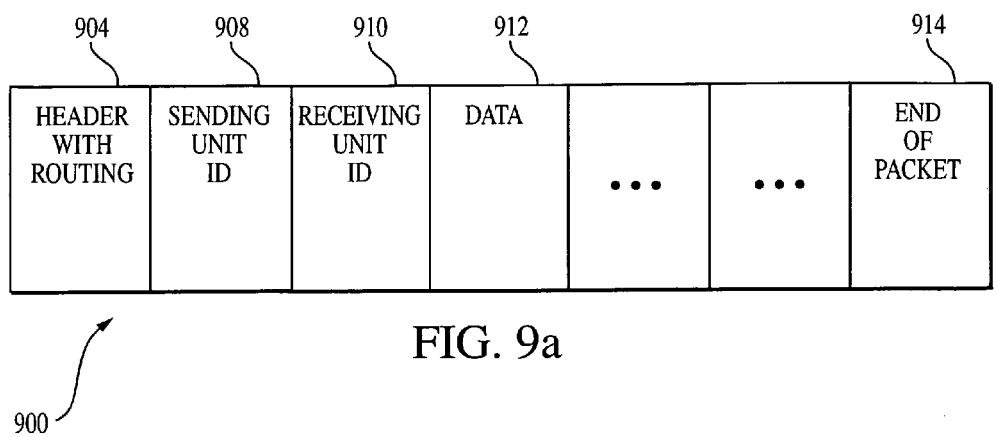
FIG. 9a shows an example of a first data format that may be transmitted from the primary network to the complementary network.
Figure 9B:
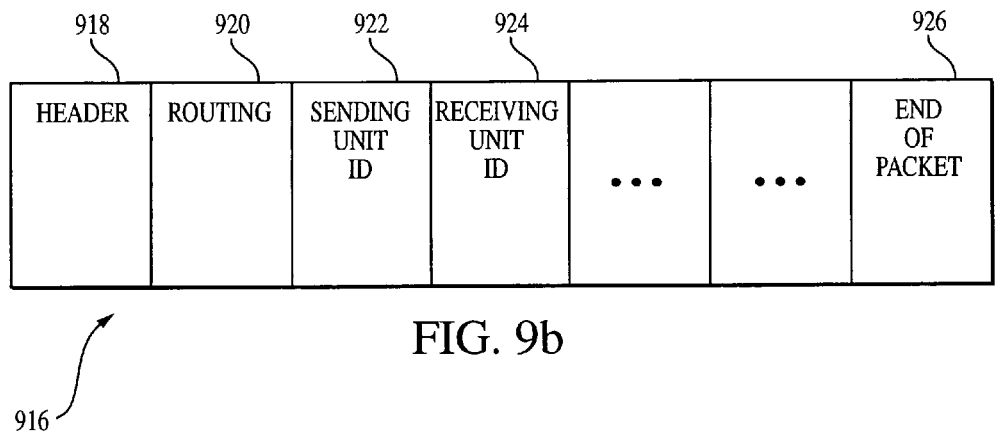
FIG. 9b shows an example of a second data format that may be transmitted from the primary network to the secondary network.

Advantageously, in accordance with one embodiment of the present invention, the reverse SCR server 722 can optionally convert the received data from a variety of data transmission protocols, and can optionally convert or obtain the correct data from a variety of data formats. For example, as illustrated in FIGS. 9a and 9b, while the same data is transmitted, a different data ordering can be used. Thus, the reverse SCR server 722 is equipped with different data format/communication protocols to accept the data in an appropriate manner. Alternatively, or in addition thereto, the reverse SCR server 722 includes the capability of receiving, converting and/or transmitting different data protocols.

More particularly, as shown in FIG. 9a, a first SU query protocol is shown 900. The header and routing field 904 may be followed by a sending unit ID field 908 and a receiving unit ID field 910. Finally, the protocol may have one or more data fields 912, which are followed by an end of packet field 914. In FIG. 9b, the second protocol 916 may comprise a header field 918, followed by a routing field 920, a sending unit ID field 922, a receiving unit ID field 924, one or more data fields 925, and an end of packet field 926. The reverse SCR server 922 may use one or more protocol conversions to interpret and transmit device queries using the different data formats in FIGS. 9a and 9b from one network to another (e.g., network 500 to network 602 and/or 606). Reverse SCR server 722 may optionally utilize the query/message header as the means or the method in determining the different data protocols to be utilized.

Figure 10A:
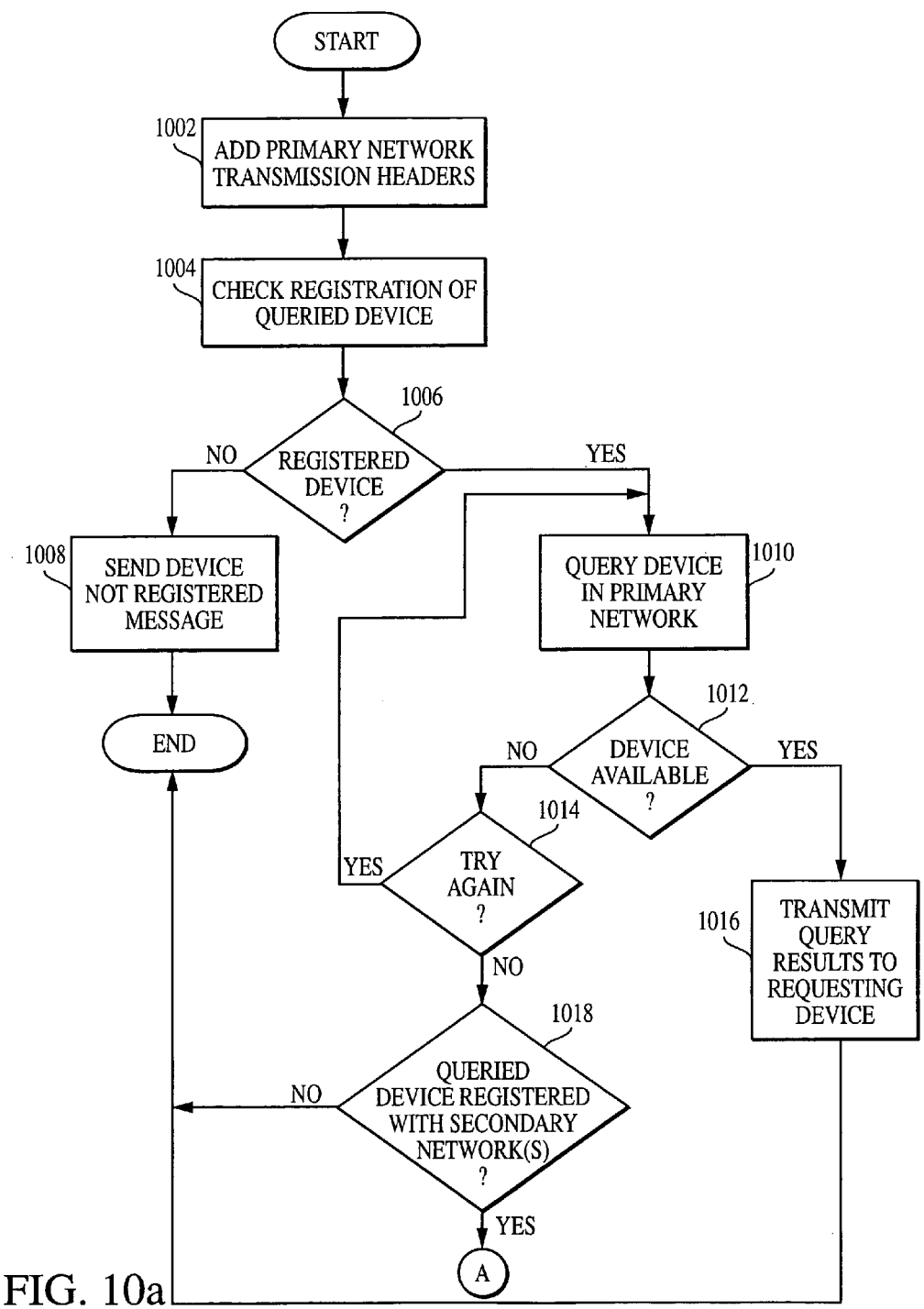
FIGS. 10a and 10b, taken together, is a flowchart of the process for querying a device that can travel between two or more networks.
Figure 10B:
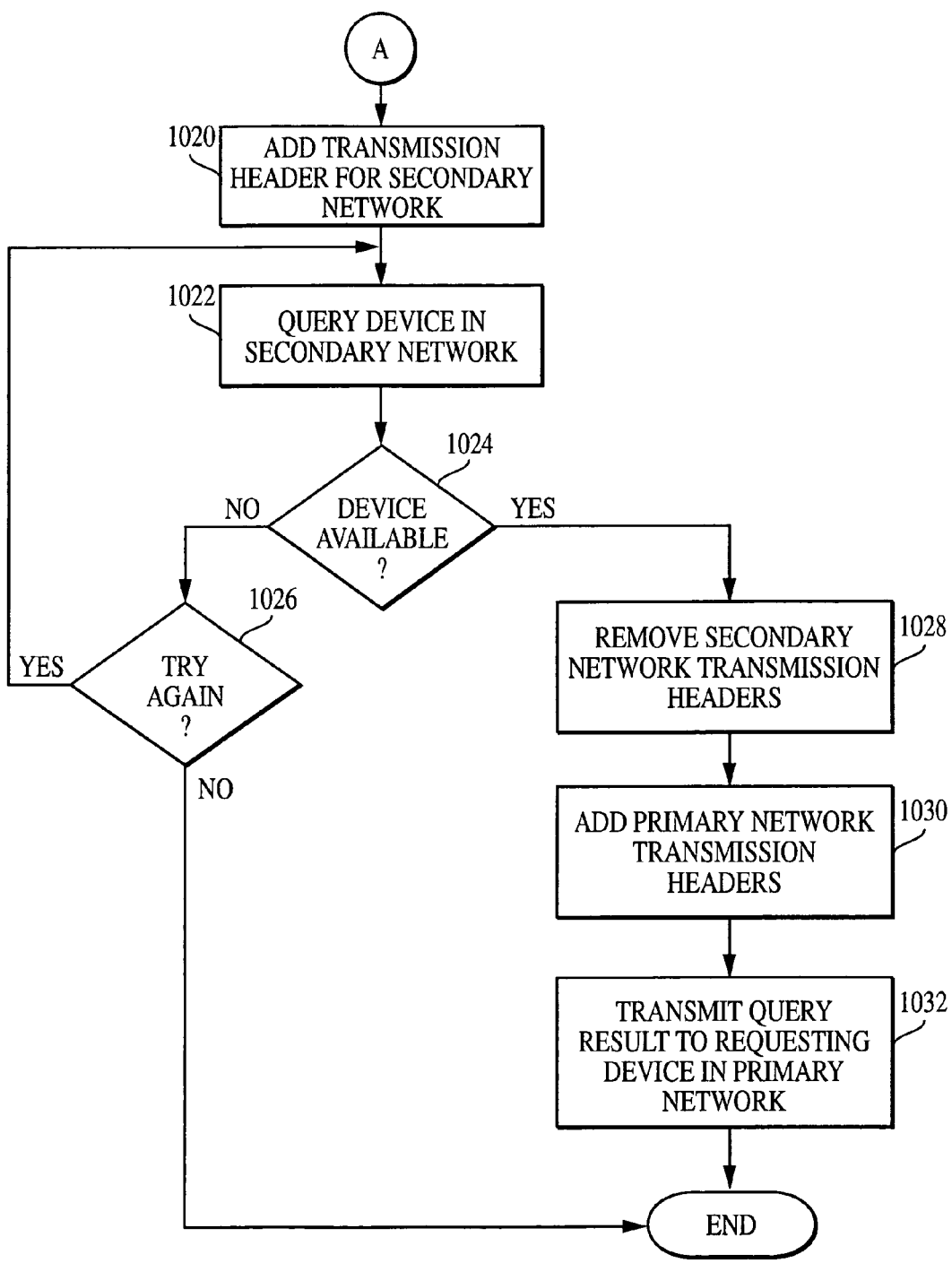

FIGS. 10a and 10b, taken together, is a flowchart of the process for querying a SU that can communicate with and/or between two or more networks in accordance with the present invention. At step 1002, primary network transmission headers are added to the query as the query will generally first check for the device (e.g., SU 402, 404, 406 and/or PC 620a) within the primary network. At step 1004, the primary network checks for the registration of the queried device. Each device is preferably registered with the networks (e.g., primary network 500 and/or secondary network 602 and/or satellite network 606) in which they may communicate. The registration or communication is preferably done in accordance standard registration processes for each respective network. Such registration information may be stored in the SU information database 808, as previously discussed.

If, at decision step 1006, it is determined that the device is not registered, the network sends a Device not registered or similar message to the querying device, and the process terminates. If, at decision step 1006, it is determined that the queried device is registered, the device is queried within the primary network at step 1010.

If, at decision step 1012, a determination is made that the device is available, the primary network transmits the results of the query to the querying device. As will be discussed herein with regard to FIGS. 11–13, the results can pertain to, for example, device availability, device roaming history, and/or a modem statistics report. If at decision step 1012 it is determined that the queried device is not available, then at decision step 1014 a determination is made whether another optional attempt should be made. The second (or subsequent) attempt can either be manually accomplished by the user, and/or automatically programmed into the system in, for example, the SCR server 722 and/or the response server 726.

If at decision step 1014 it is determined that another device query attempt will not be made, then at decision step 1018, a determination is made whether the queried device is registered with a secondary network or whether a secondary network should be queried. If it is determined that the device is not registered with a secondary network or that a secondary network should not be queried, then the process ends. If at decision step 1018 a determination is made that the queried device is registered with one or more secondary networks or a secondary network should be queried then, at step 1020, transmission headers for the secondary network are added to the query, and the device is queried at step 1022.

At decision step 1024 a determination is made whether the device is available in the secondary network. If it is determined that the device is not available, a determination is made at decision step 1026 whether another attempt should be made. If it is determined that another device query attempt should be made, the process returns to step 1022. If it is determined that another attempt will not be made, the process ends.

If at decision step 1024 a determination is made that the queried device is available in the secondary network, the secondary network transmission headers are removed at step 1028, and the primary network transmission headers are added at step 1030 so the query result(s) can be transmitted back to the querying device (e.g., PC 620a) of the primary network at step 1032.

FIG. 11 shows an exemplary screen shot of a when a user utilizes a SU 402, 404, 406 and/or PC 620a to obtain SU information and/or initiate a query request via, for example, display button 1134. A user first enters the identifier of a subscriber unit 402, 404, 406 he wishes to query in field 1102. In other embodiments, a user can enter a SU 402, 404, 406 IP address in lieu of or in addition to the SU identifier. The display verifies the subscriber unit at field 1103. Field 1104 provides the Current Status of the subscriber unit. In FIG. 11, the current status indicator is In Service, which means that the subscriber unit is in a state where outbound messages to the unit can be attempted or inbound messages from the unit can be received by the network. A status indicator of, for example, Out of Service could be used to indicate that the unit is currently powered off, and that no outbound messages to the subscriber will be attempted when in this state. A status indicator of, for example, Out of Reach could be used, optionally based on the value of the Max Message Retries field 1120, to indicate that the unit is currently not reachable. The status can remain in this state until the unit is either reregistered, sends an inbound message, and/or the Out of Reach Delay 1126 time expires. While a unit is in the out of reach state, no further outbound messages to the subscriber are attempted.

Last Known Location field 1106 provides an indication of the last known base station 410 and/or RF/NCP 412 the subscriber was utilizing. Other devices for different networks can equally be utilized. Contract field 1108 provides an indication of the billing contract number and/or name.

Home Switch field 1110 indicates the RF/NCP 412 registered as the subscriber's home. Other or equivalent switches can equally be used. On the Motient$^{SM}$ network 400, possible switches can include, for example, \LS0=Chicago, \LS1=Dallas, \LS2=White Plains, N.Y., \LS3=Washington D.C., \LS4=Atlanta, \LS5=Los Angeles LSA. Other cities and/or designators can equally be utilized.

Active field 1112 provides an indication of whether the unit is registered and/or allowed to receive and/or transmit messages. A "N" could indicate that the unit is not authorized to receive or transmit messages.

Roam Type field 1114 provides an indication of the unit's type of roaming. Fully Automated indicates that the unit has, for example, an international roaming capability. With Global System for Mobile Communication (GSM), for example, a user can have one phone, one number, and utilize the respective network operators in two or more countries. A user can, for example, roam to another country (or region within a country) and use the services of any network operator in that country (or region) that has a roaming agreement with a user's home GSM network operator. Different protocols and/or air interfaces can also optionally be used between two or more countries and or regions. Other designators can also be used to indicate, for example, that the unit has a national roaming capability.

Customer Group field 1116 is applicable when MG Peer-to-Peer messaging is enabled. As previously discussed with regard to FIG. 7, MG Peer-to-Peer messaging can be utilized when a first device 402a queries a second device 402b, independent of and without using a host 408.

Max Message Age field 1118 indicates the number of hours a low priority message will be stored and retried. If a subscriber transmits and receives only high priority messages, this field is not applicable.

Max Message Retries field 1120 indicates the number of consecutive outbound failure attempts a unit can have before the unit is placed in, for example, the out of reach state. For example, if the Max Message Retries field 1120 is set to 2, then after 2 consecutive outbound (to subscriber unit) failures, the subscriber unit will be placed in the out of reach state. The subscriber unit will remain in this state until either subscriber, for example, either re-registers to the network, sends an inbound message, or the Out of Reach Delay 1126 time expires. While a subscriber is in the out of reach state no further outbound messages to the subscriber will be attempted.

Retry Delay field 1122 indicates the number of seconds to wait between retry attempts of a low priority message. If a subscriber transmits and receives only high priority messages, this field is not applicable.

Power Save field 1124 indicates whether the unit was using Power Save mode. A "Y" indicates that power save mode is active. Power save mode generally causes an increase in the amount of time (e.g., a total time in the range of 2 minutes to 10 minutes) it takes for the unit to transmit outbound responses.

Out of Reach Delay field 1126 indicates the maximum number of time (e.g., seconds) a unit will remain in an out of reach state before returning to "In Service" state.

Host Information: display area 1128 contains columns for Slot, Active, Host Name, Host ID, and Contract. A slot corresponds to a logical mapping of the IP address of a given host. Active indicates whether a Slot is active and may be used as a destination address for messages received from a subscriber. Host Name is a name associated with a host connection. Host ID is the network IP address associated with a physical host connection. Contract can optionally be utilized to enter, for example, a contract name, number and/or combination thereof to override the contract specified at the subscriber level.

Default Host Slot field 1130 is the default host slot number to send to if no destination slot is specified in the inbound message received from a subscriber.

Host Down Diagnostic Format field 1132 is a code indicating the format used in creating system error messages sent to a subscriber.

The exemplary display shown in FIG. 11 also allows a user to enter various commands that can be issued to the modem of the specified device/SU to test, for example, RF network connectivity. If a user selects the Ping Request button, an RF "ping" request will be sent to the physical RF modem associated with the subscriber unit. As used generically herein, the term ping is synonymous with the term query, and can be used to denote the sending of, for example, a packet from one device (the querying device), attempting to "bounce" it off or transmit to another device (the queried device), and "listening" for or receiving the reply. A response will be returned and displayed in the Network Diagnostics: window indicating whether the subscriber unit modem successfully received the ping request.

If a user selects Echo Request, the user first enters some text in the Network Diagnostics: window, and then selects the Echo Request button 1136. This will cause the entered text to be sent to the physical RF modem associated with the subscriber unit entered in field 1102. Once successfully received by the RF modem, the unit will respond with an RF acknowledgement and send the same text string back to be displayed in the Network Diagnostics: window. Current Status 1104 of the SU entered in field 1102 will also be updated.

When a user selects the Roaming History Report button 1140, the roaming history may be displayed as shown in FIG. 12. The columns shown in FIG. 12 are TIME (GMT), Network, Status, and Power Save. TIME (GMT) is the Greenwich Mean Time of reported status. Network indicates the RF/RNC 412 the unit was communicating over.

Status provides the same information as Current Status 1104. More specifically, In Service indicates that the unit is in a state where outbound messages to the unit can be attempted or inbound messages from the subscriber can be received. Out of Service indicates that the unit is currently powered off, and that no outbound messages to the unit will be attempted when in this state. Out of Reach can optionally be based on the value of the Max Message Retries field 1120.

The information shown in the exemplary display of FIG. 12 can be stored, for example, in a conventional database such as SUINFO database 808. The database 808 can be updated each time the status of the Network, Status and of Power Save change.

Returning now to FIG. 11, if a user selects Stats Request button 1138, this command will cause a statistics request to be sent to the physical RF modem associated with the subscriber unit entered in field 1102. Once successfully received by the RF modem, the subscriber unit associated with the modem will respond with an RF acknowledgement, and return a series of conventional RF modem statistics, as exemplified in FIG. 13, which can be displayed, for example, in the Network Diagnostics: window or in a separate display (not shown). Other information, such as modem manufacturer and/or model number, and/or modem speed, can also optionally be displayed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

We claim:

1. A system enabling a first device operatively communicable with at least a primary wireless network to transmit a device query to a wireless device operatively communicable with the primary wireless network and at least a secondary wireless network, said system comprising:

a host computer, operatively communicable with the primary wireless network, capable of receiving a query from the first device;

a routing switch receiving the query from said host computer, retrieving a profile of the wireless device comprising network data characteristic of communication requirements associated with the primary wireless network and the secondary wireless network with which the wireless device is communicable, appending to the query a first transmission header characteristic of first communication requirements associated with the primary wireless network, transmitting the query and the first transmission header to the primary wireless network and, responsive to the profile after a predetermined number of transmission attempts in the primary wireless network, appending a second transmission header characteristic of second communication requirements associated with the secondary wireless network to the query in accordance with a communication protocol used by the secondary wireless network, and transmitting the query and the second transmission header to the secondary wireless network; and a switch operatively communicable with the secondary wireless network for receiving the query and the second transmission header transmitted by said routing switch, transmitting the query and at least a portion of the second transmission header to the wireless device via the secondary wireless network, and transmitting a query response from the wireless device to the first device.

2. The system according to claim 1, wherein said routing switch queues each query prior to transmitting to the secondary wireless network.

3. The system according to claim 1, wherein the query comprises at least one of a wireless device availability check, a roaming history report and a modem statistics report.

4. The system according to claim 1, wherein the first device is a wireless device registered with the primary wireless network.

5. The system according to claim 1, wherein the first device is a non-wireless device registered with the primary wireless network.

6. A system enabling a first device operatively communicable with at least a primary wireless network to query a wireless device operatively communicable with the primary wireless network and at least a secondary wireless network, said system comprising:

a primary wireless network comprising a routing switch receiving the query from the first device, retrieving a profile of the wireless device comprising network data characteristic of communication requirements associated with the primary wireless network and the secondary wireless network with which the wireless device is communicable, appending to the query a first transmission header characteristic of internal routing and radio frequency communication requirements associated with the primary wireless network, transmitting the query and at least a portion of the first transmission header to the wireless device in the primary wireless network and, responsive to the profile after a predetermined number of transmission attempts in the primary wireless network, appending a second transmission header characteristic of second internal routing and radio frequency communication requirements associated with the secondary network, and transmitting the query and the second transmission header to the secondary wireless network; and a switch operatively communicable with the secondary wireless network for receiving the query and the second transmission header transmitted by said routing switch, transmitting the query and at least a portion of the second transmission header to the wireless device via the secondary wireless network, and transmitting a query response from the wireless device to the first device.

7. The system according to claim 6, wherein said routing switch queues each query prior to transmitting to the secondary wireless network.

8. The system according to claim 6, wherein the query comprises at least one of a wireless device availability check, a roaming history report and a modem statistics report.

9. The system according to claim 6, wherein the first device is a wireless device registered with at least the primary wireless network.

10. The system according to claim 6, wherein the first device is a non-wireless device registered with at least the primary wireless network.

* * * * *

UNITED STATES PATENT AND TRADEMARK OFFICE
CERTIFICATE OF CORRECTION

PATENT NO.         : 7,136,642 B1
APPLICATION NO.    : 11/370103
DATED              : November 14, 2006
INVENTOR(S)        : Massie et al.

It is certified that error appears in the above-identified patent and that said Letters Patent is hereby corrected as shown below:

Title Page 1, Item (56), U.S. PATENT DOCUMENTS, Column 2, line 15, "Campana Jr. et al." should read -- Compana Jr. et al. --

Title Page 2 of Prior Art, Item (56), OTHER PUBLICATIONS, Column 1, 2$^{nd}$ document, "Technical Information: Routing Requirements on the Moteint Network." should read -- Technical Information: Routing Requirements on the Motient Network. --

Title Page 2 of Prior Art, Item (56), OTHER PUBLICATIONS, Column 1, 10$^{th}$ document, "Computer Associates and Moteint Extend Wireless Enterprise Applications for eBusiness." should read -- Computer Associates and Motient Extend Wireless Enterprise Applications for eBusiness. --

Title Page 2 of Prior Art, Item (56), OTHER PUBLICATIONS, Column 2, 22$^{nd}$ document, "*Programmer's Guide.* Richmond," should read -- *Programmer's Guide* (Doc. No. 68P04053C04 REV1). Richmond, --

Title Page 2 of Prior Art, Item (56), OTHER PUBLICATIONS, Column 2, 23$^{rd}$ document, "*Release 1.0* Richmond," should read -- *Release 1.0* (Doc. No. 68P04025C10-A). Richmond, --

Title Page 2 of Prior Art, Item (56), OTHER PUBLICATIONS, Column 2, 24$^{th}$ document, "*Development Guide* Bothell," should read -- *Development Guide.* (Doc. No. 6804111L20-A). Bothell, --

Title Page 2 of Prior Art, Item (56), OTHER PUBLICATIONS, Column 2, 26$^{th}$ document, "Mobile Ntework Tracing." should read -- Mobile Network Tracing. --

Title Page 3 of Prior Art, Item (56), OTHER PUBLICATIONS, Column 1, 9$^{th}$ document, "Entrerprise Management Strategy:" should read -- Enterprise Management Strategy: --

Column 1, line 67, "device 12" should read -- device 312 --

Signed and Sealed this
Thirtieth Day of October, 2012

David J. Kappos
*Director of the United States Patent and Trademark Office*

CERTIFICATE OF CORRECTION (continued)
U.S. Pat. No. 7,136,642 B1

Column 2, line 51, "router 36" should read -- router 136 --

Column 2, line 55, "router 36" should read -- router 136 --

Column 2, line 67, "router 38" should read -- router 138 --

Column 3, line 13, "manager 40" should read -- manager 140 --

Column 3, line 21, "workstation 142" should read -- workstation 242 --

Column 3, line 31, "Manager 110" should read -- Manager 240 --

Column 3, line 63, "program 58" should read -- program 258 --

Column 4, line 37, "manager 40" should read -- manager 240 --

Column 4, line 41, "S2 and S2" should read -- S2 and S3 --

Column 5, line 19, "network 10" should read -- network 310 --

Column 10, line 6, "area" should read -- areas --

Column 12, line 19, "a).com; b).net; c) org; d).edu; e).gov; f) mil; and g) .int." should read -- a) .com; b) .net; c) .org; d) .edu; e) .gov; f) .mil; and g) .int. --

Column 12, line 21, ".biz, info, pro, etc)." should read -- .biz, .info, .pro, etc). --

Column 14, line 24, "associate" should read -- associated --

Column 15, line 40, "Facsimile Service Via Agent Gateway" should be centered in the column.

Column 16, line 47, "a IP" should read -- an IP --

Column 17, lines 43-44 and 60, "402, 404, 406" should be bolded.

Column 18, line 19, "The 113 header" should read -- The IB header --

Column 18, line 31, "the OB" should read -- the BO --

Column 18, line 40, "November 1995);" should read -- November 1995; --

Column 18, line 60, "devices via a" should read -- devices via an --

Column 19, line 19, "to secondary" should read -- to a secondary --

CERTIFICATE OF CORRECTION (continued)
U.S. Pat. No. 7,136,642 B1

Column 19, line 26, "11B" should read -- IB --

Column 21, lines 41 and 47, "402, 404, 406" should be bolded.

Column 24, line 37, "LSO" should read -- LS0 --